US006764395B1

(12) United States Patent
Guyett

(10) Patent No.: US 6,764,395 B1
(45) Date of Patent: Jul. 20, 2004

(54) METHOD AND APPARATUS FOR PLAYING ADVERTISEMENT PROMOTION GAME

(76) Inventor: Irvin P. R. Guyett, 307 Fourth Ave., Pittsburgh, PA (US) 15222

( * ) Notice: Subject to any disclaimer, the term of this patent is extended or adjusted under 35 U.S.C. 154(b) by 0 days.

(21) Appl. No.: 09/557,895

(22) Filed: Apr. 21, 2000

(51) Int. Cl.[7] ................................................. A63F 9/24
(52) U.S. Cl. ............................ 463/9; 273/430; 273/236
(58) Field of Search ..................... 463/1, 9–10, 16, 463/25, 29, 30, 36, 40–42; 273/237, 236, 429, 430, 431, 432; 705/64, 65, 67, 1, 10, 14; 340/323 R, 825

(56) References Cited

U.S. PATENT DOCUMENTS 5,697,844 A * 12/1997 Von Kohorn
5,823,879 A * 10/1998 Goldberg

OTHER PUBLICATIONS

Advertising Slogans, Department of Advertising, The University of Texas at Austin, 1–45, Feb. 10, 1997.*

* cited by examiner

Primary Examiner—Mark Sager
(74) Attorney, Agent, or Firm—Carothers & Carothers

(57) ABSTRACT

A game of skill wherein a database of advertisement segments from published advertisements is generated and stored and selections of the advertisement segments are displayed or presented to a player for sponsor source identification. The player makes identifications of sponsor sources for the respective advertisement segments presented and these identifications are evaluated for correctness and then displayed to the player. A reward for winning may be provided.

33 Claims, 38 Drawing Sheets

FIG. 1

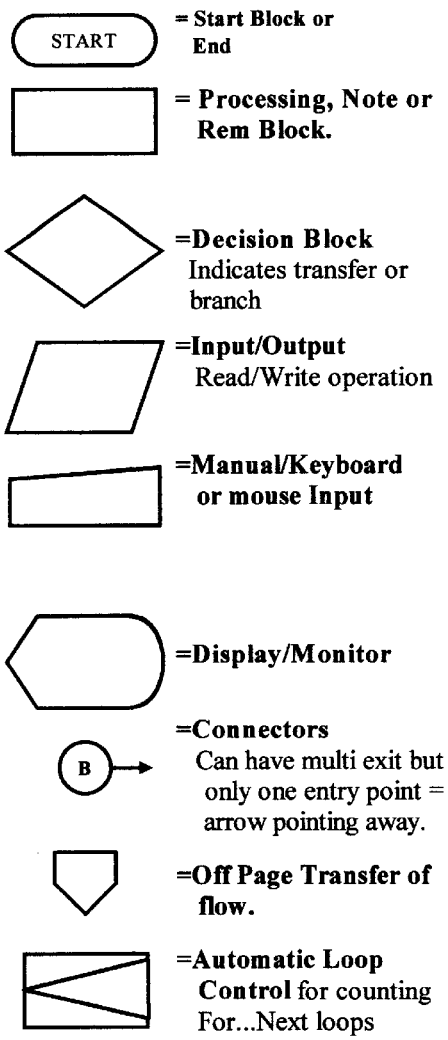

= Start Block or End

= Processing, Note or Rem Block.

=Decision Block Indicates transfer or branch

=Input/Output Read/Write operation

=Manual/Keyboard or mouse Input

=Display/Monitor

=Connectors Can have multi exit but only one entry point = arrow pointing away.

=Off Page Transfer of flow.

=Automatic Loop Control for counting For...Next loops

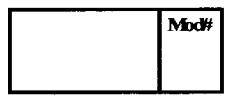 =Module = is a broad collection of procedures to produce an outcome. The letter under "Mod#" is a code to identify this specific, elaborated collection.

 =Subordinate module(s) object to accomplish an outcome and is not elaborated elsewhere in the charts.

ABBREVIATIONS USED:
AE AdExcitement.com
Ad = Advertisement
# = number
Caller = is the point in the program calling for a Module or sub module and to which the flow will return once the Module has been executed.
Concurrent = program is running in background.
Slice = Single frame of video or or segment.
Db = Database
Element = A component within a slice, a part of an image.
Point of rejection = where person/player leaves game.
REM = Remark or note

Coding from connectors and off page referencing, use:
X>Y = The letters and numbers representing the program flow between pages and/or sub routines.
X1 = uses a subordinate number to reference a connection within a page.
Xb = uses a subordinate letter to reference a continuation of this module to another page as from "Xa5>Xb1..
# = start from "1" within a given page.

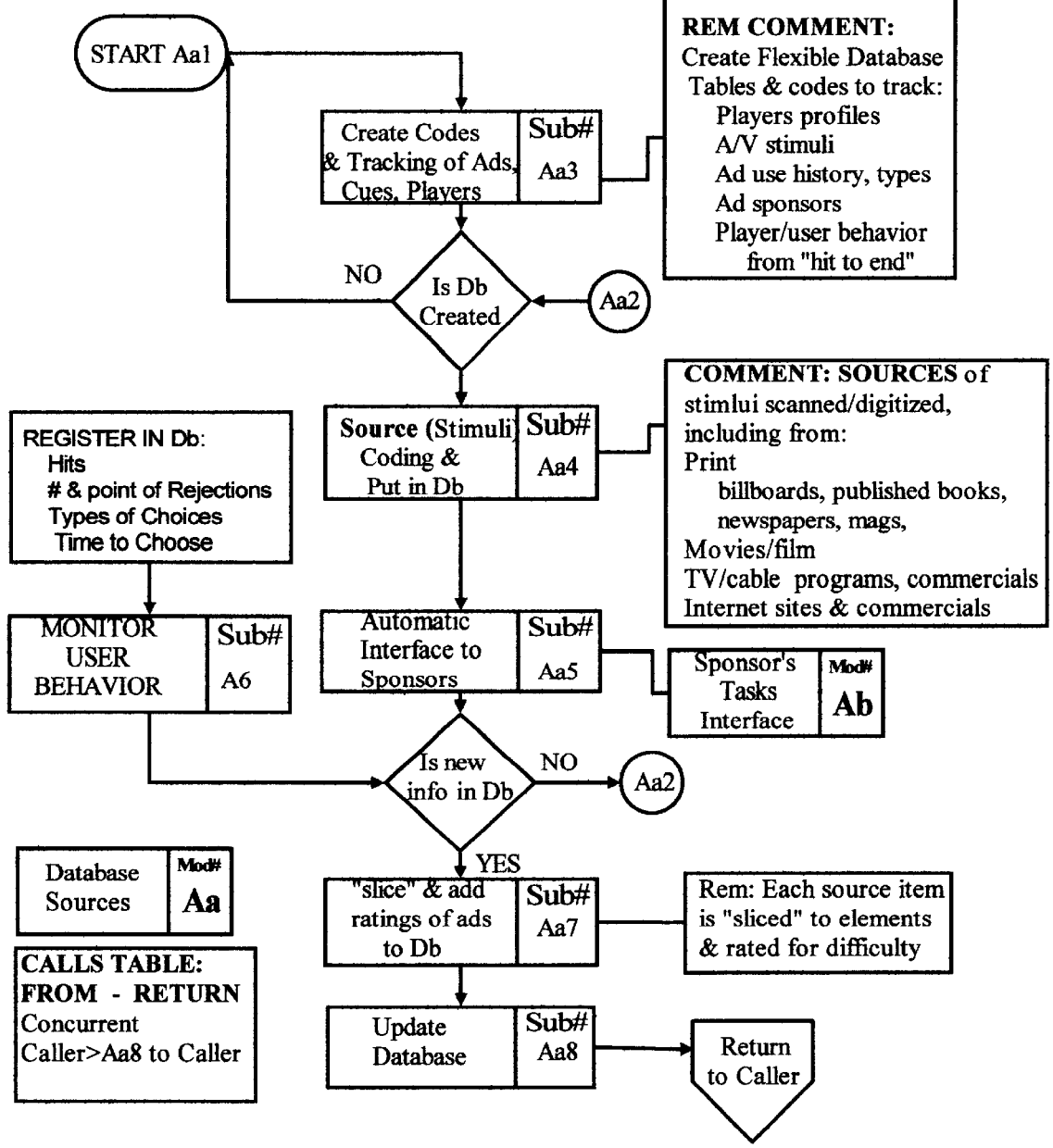

Fig. 6
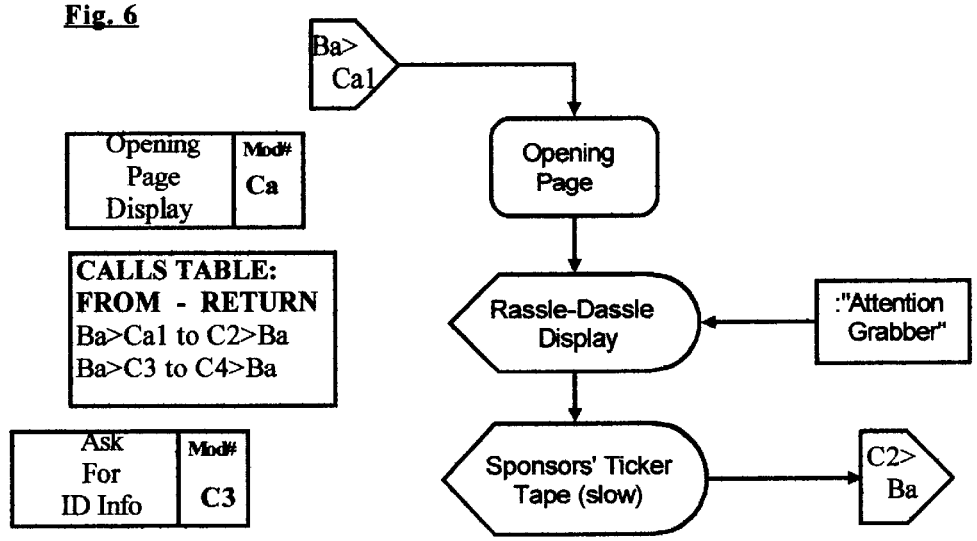
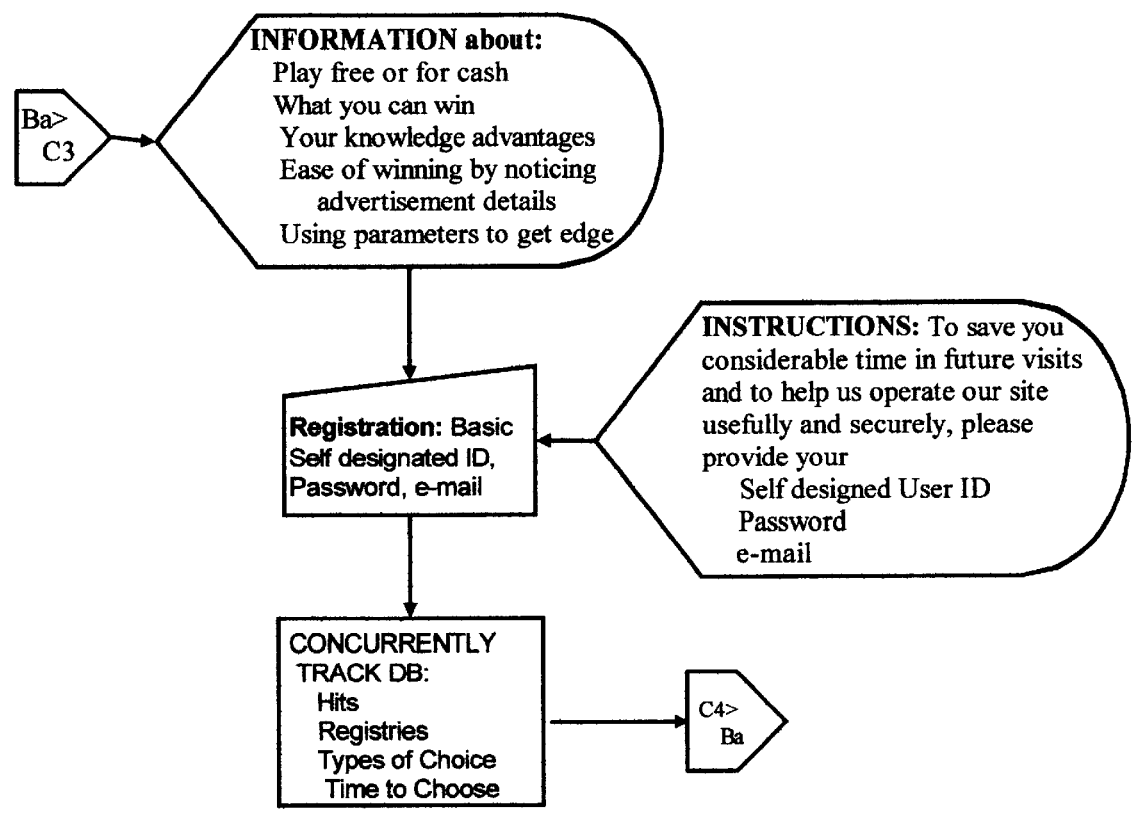

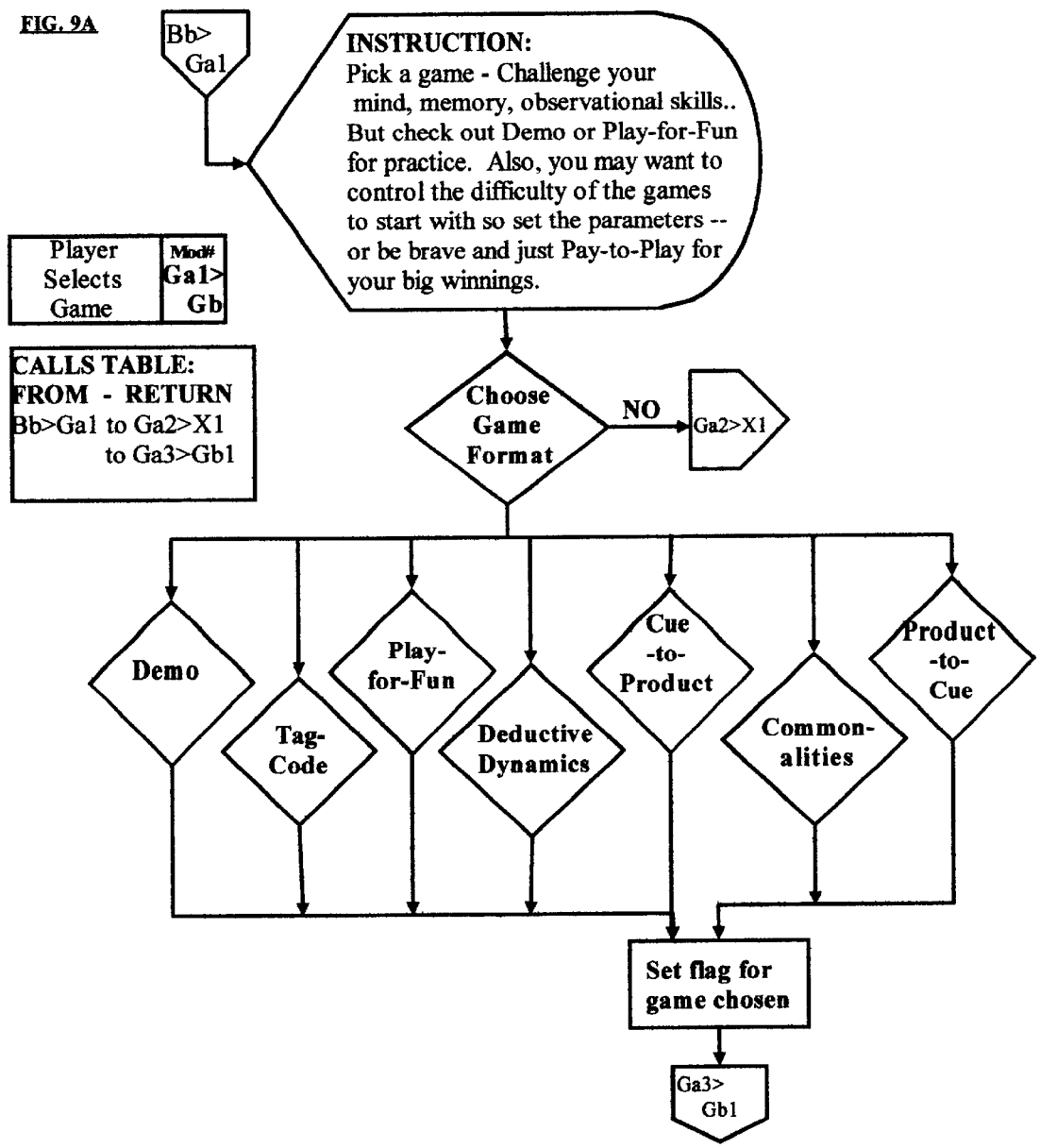

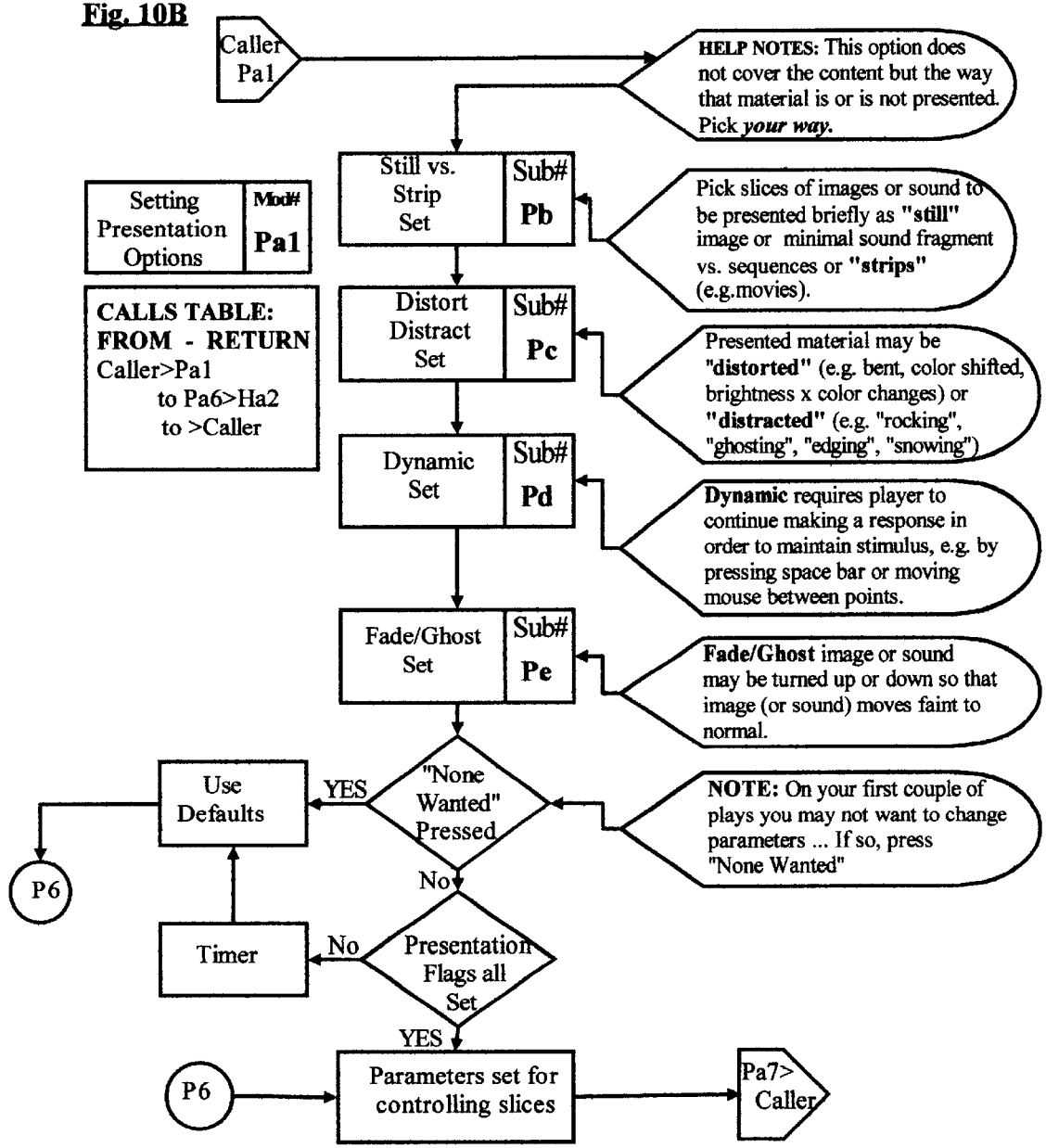

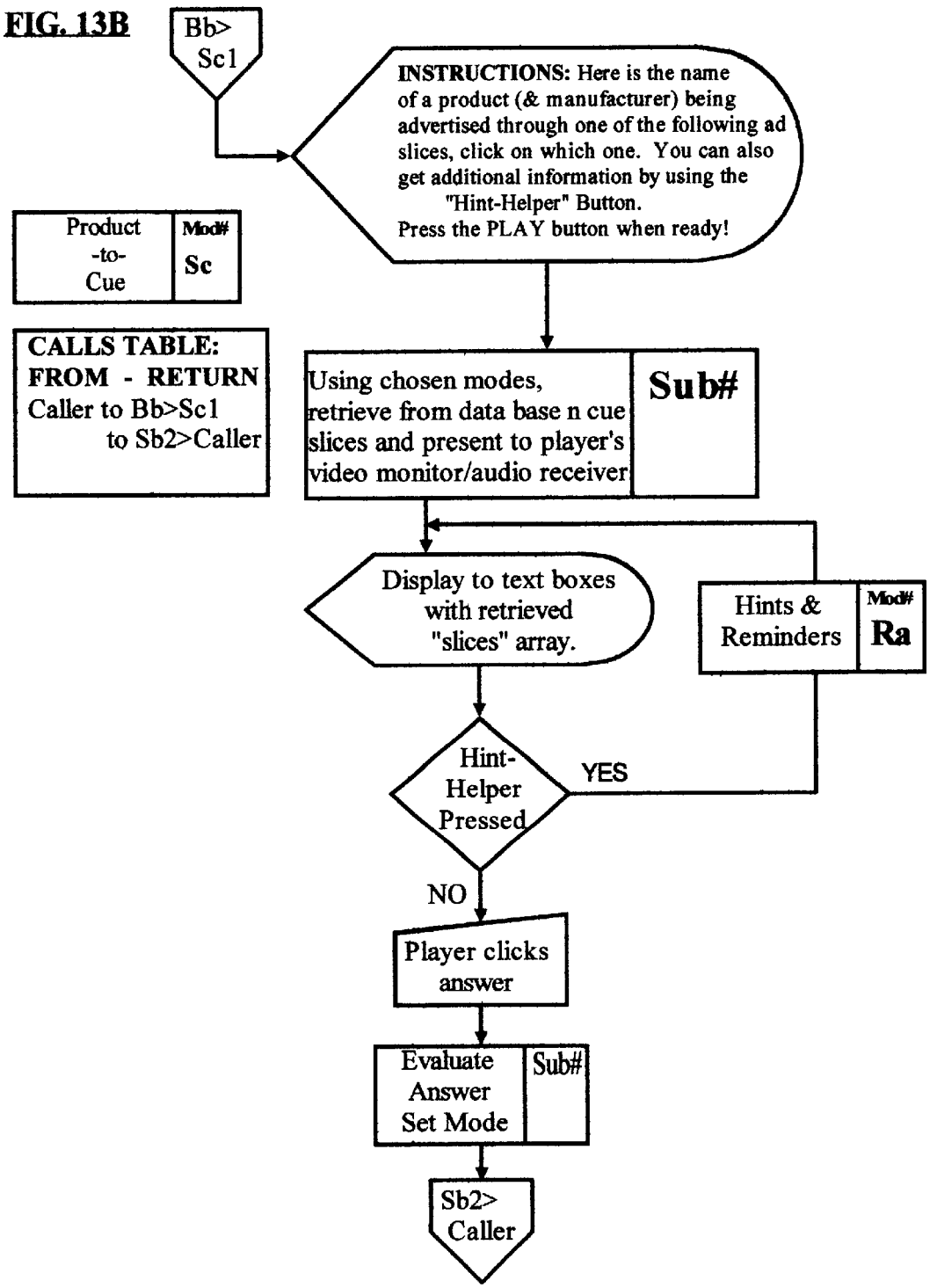

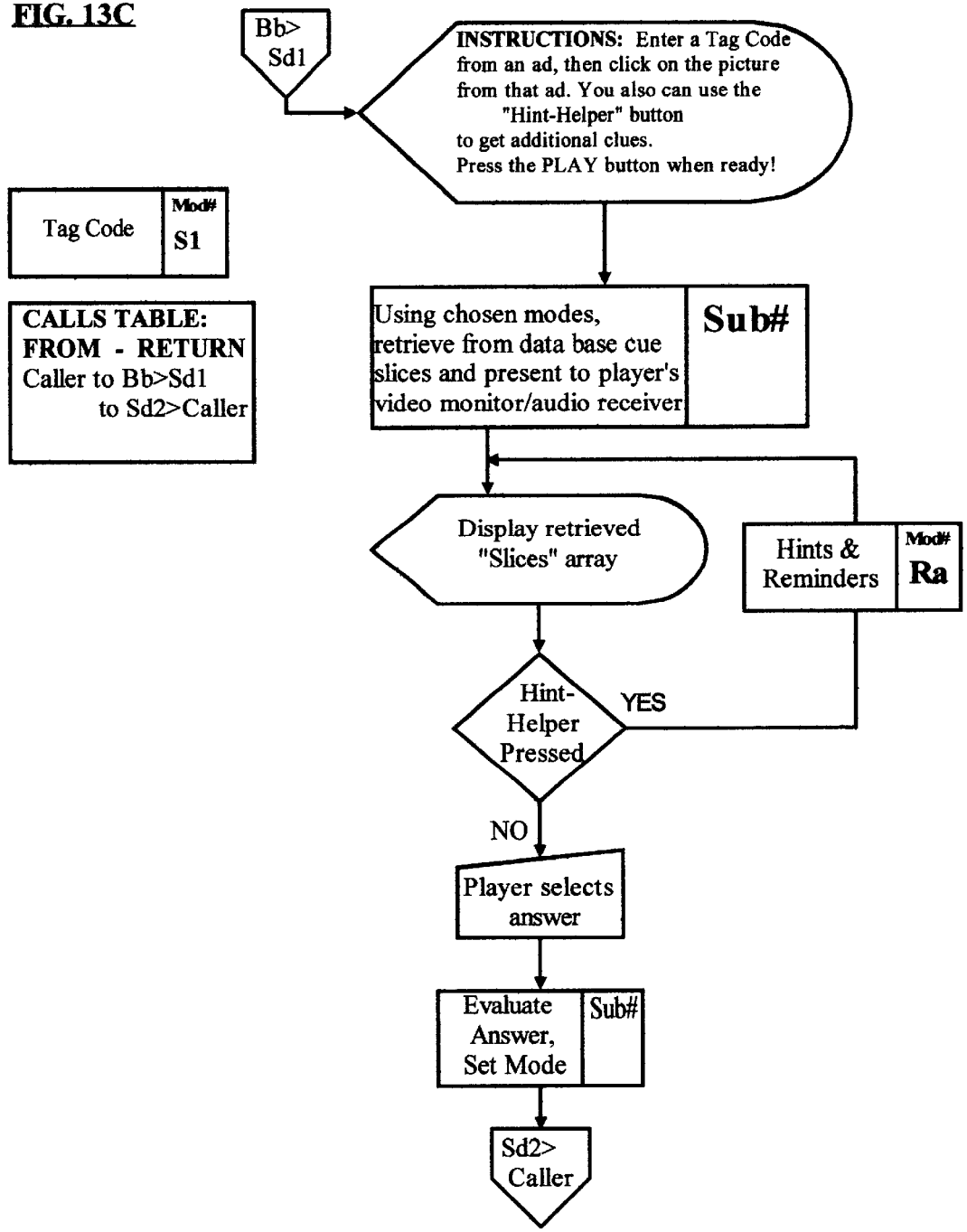

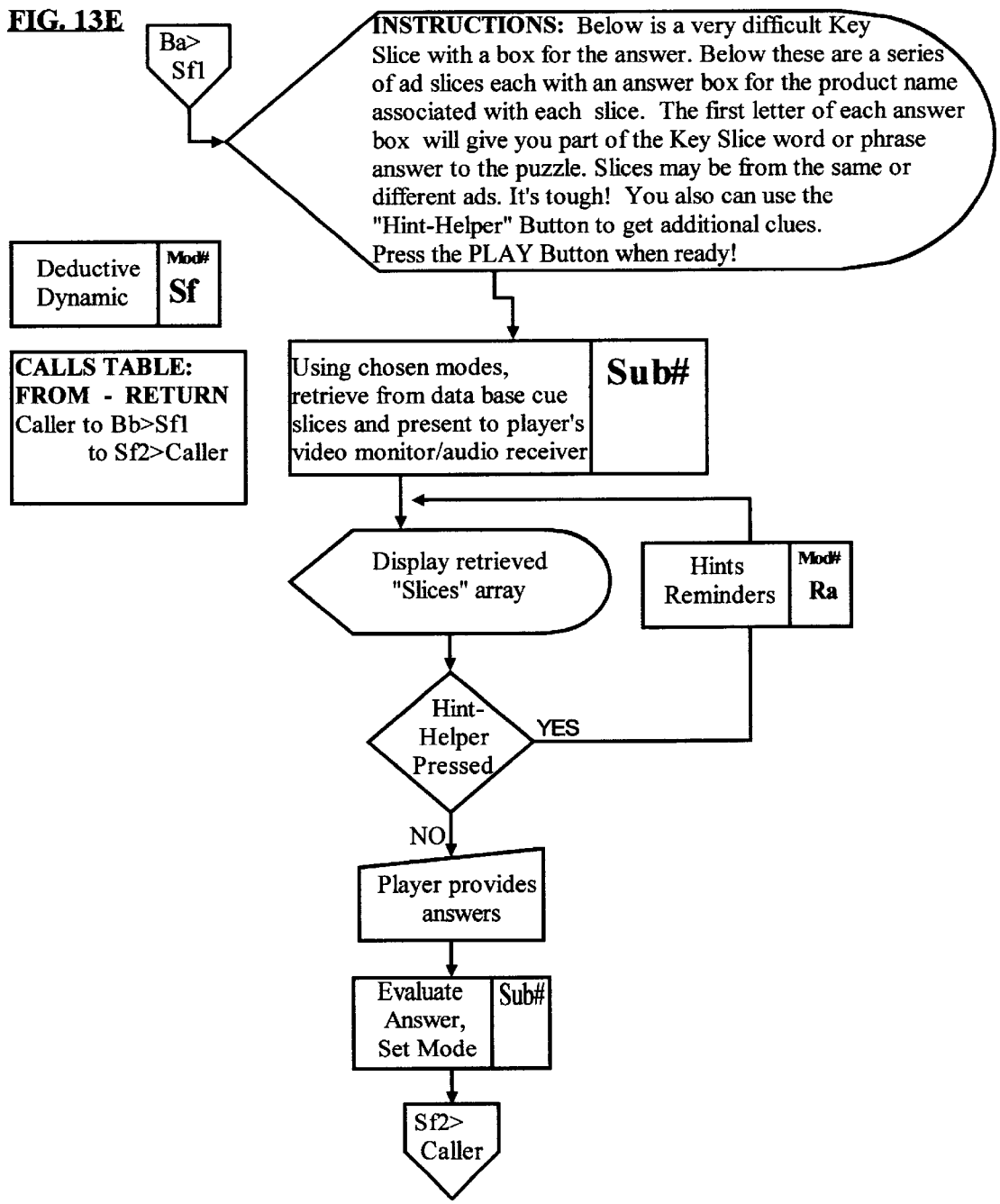

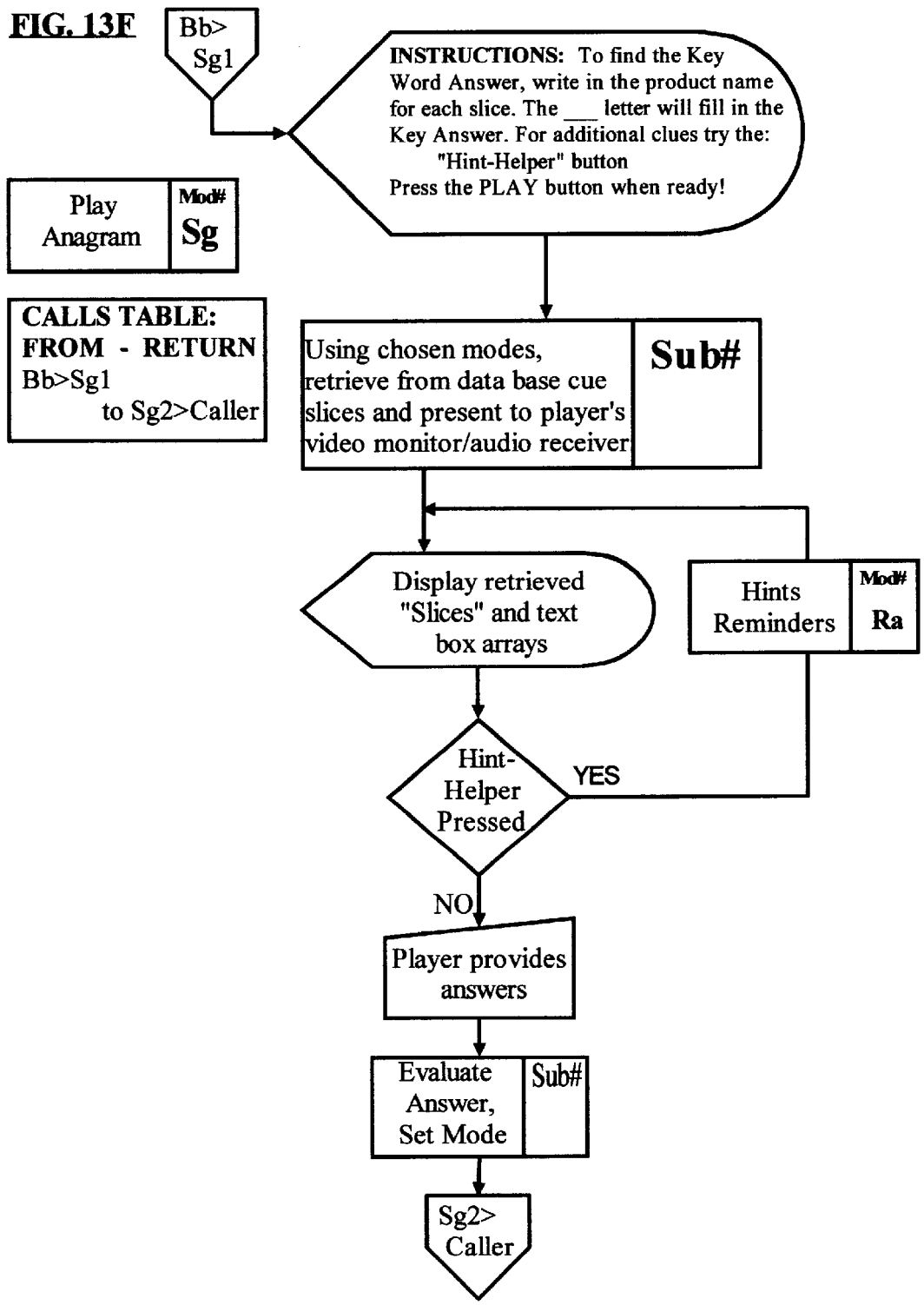

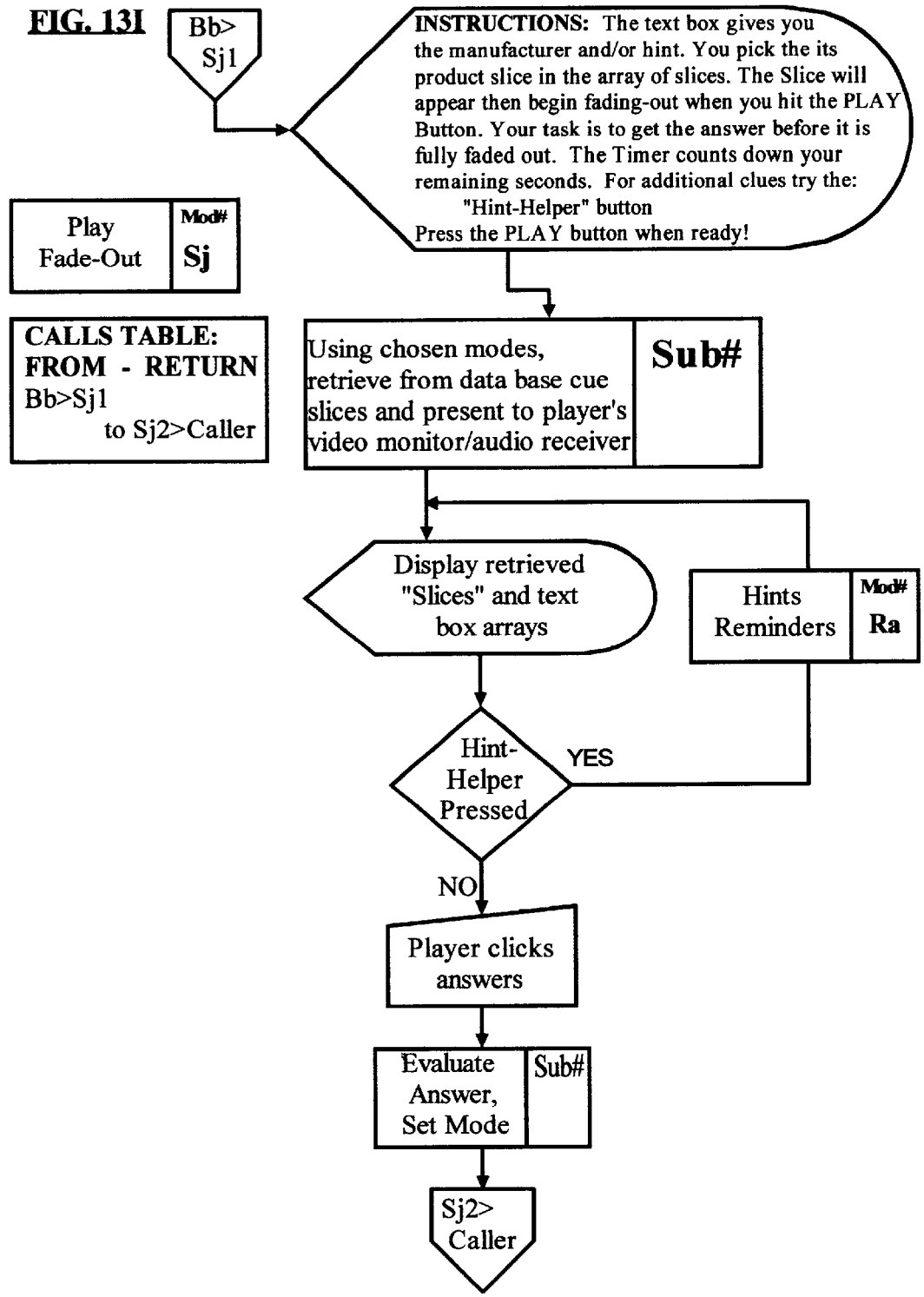

NOTE: This is a simulated screen example as presented to the player. It is set much as internet screens are displayed such that when game is high lighted, the cursor and item change if an informational tip is associated with this selection. A tip "drops down" if the item is clicked. Double clicking the item results in that game being selected as in this example.

FIG. 16B

NOTE: Here the player is presented with options for setting background filters for how the game is to be constructed. In this instance, the player has single clicked on the "Difficulty of Play" and the drop-down information tip is displayed with mutually exclusive options. The easy mode is checked. This changes the level of Payoff as is shown. The player could work through several of the other options if desired, similarly raising or lowering the payoff rate or s/he could hit play and move on to the game itself.

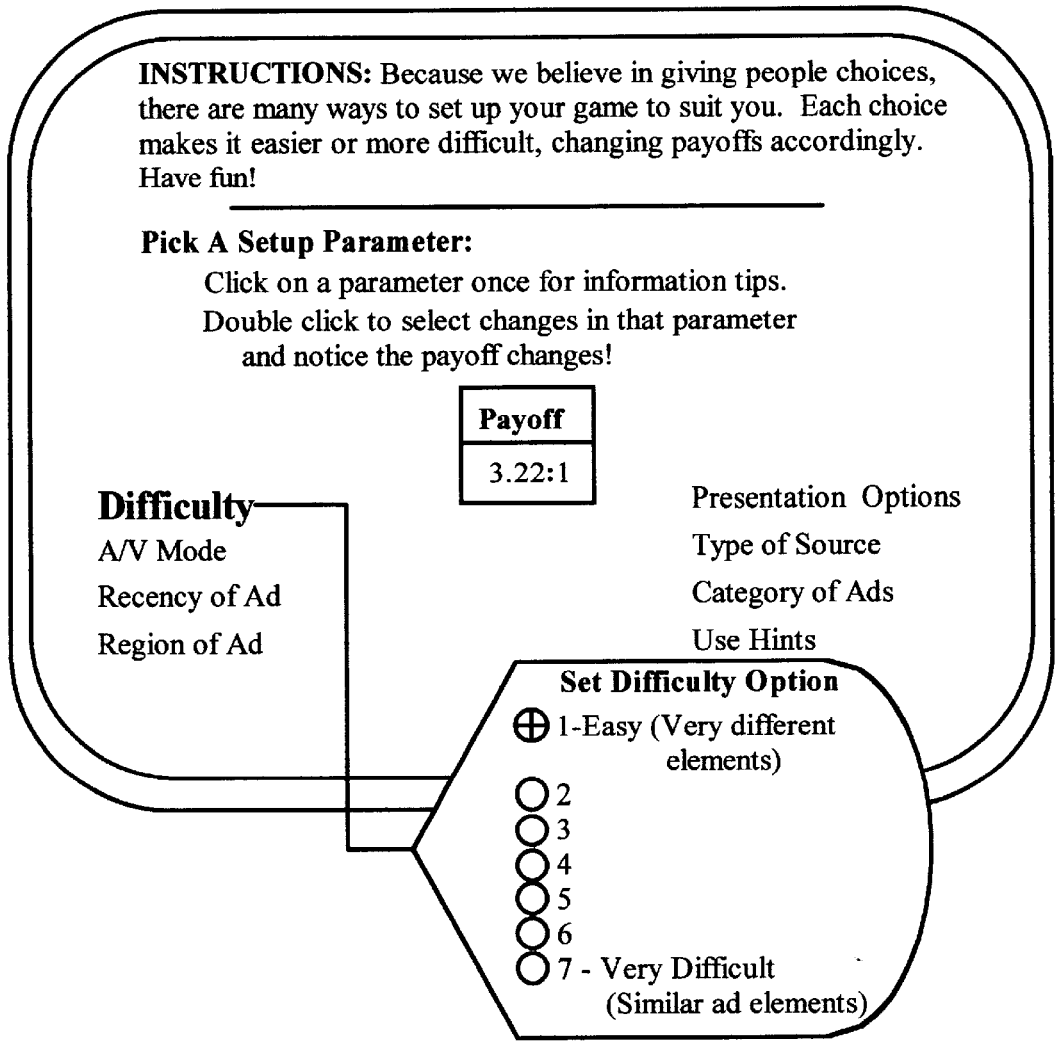

FIG. 16C

NOTE: Because the player selected an "Easy" level of difficulty, the pictures (a-h) selected to compete with the correct answer "X" are each fairly different, making discrimination of recall from the Tag-Coded cue ad easier. The player can see what the present payoff rate is and, if unsure about h/er answer, can press "Hint-Helper" to select a variety of clues, which will make it easier but change the current Payoff rate. If double clicking results in a win, "What A Winner" flashes for several seconds. Then it changes to "Try Again", shortly disappears and "Enter Tag-Code" begins to flash as "n Play" changes to the next game number in the set and the process repeats.

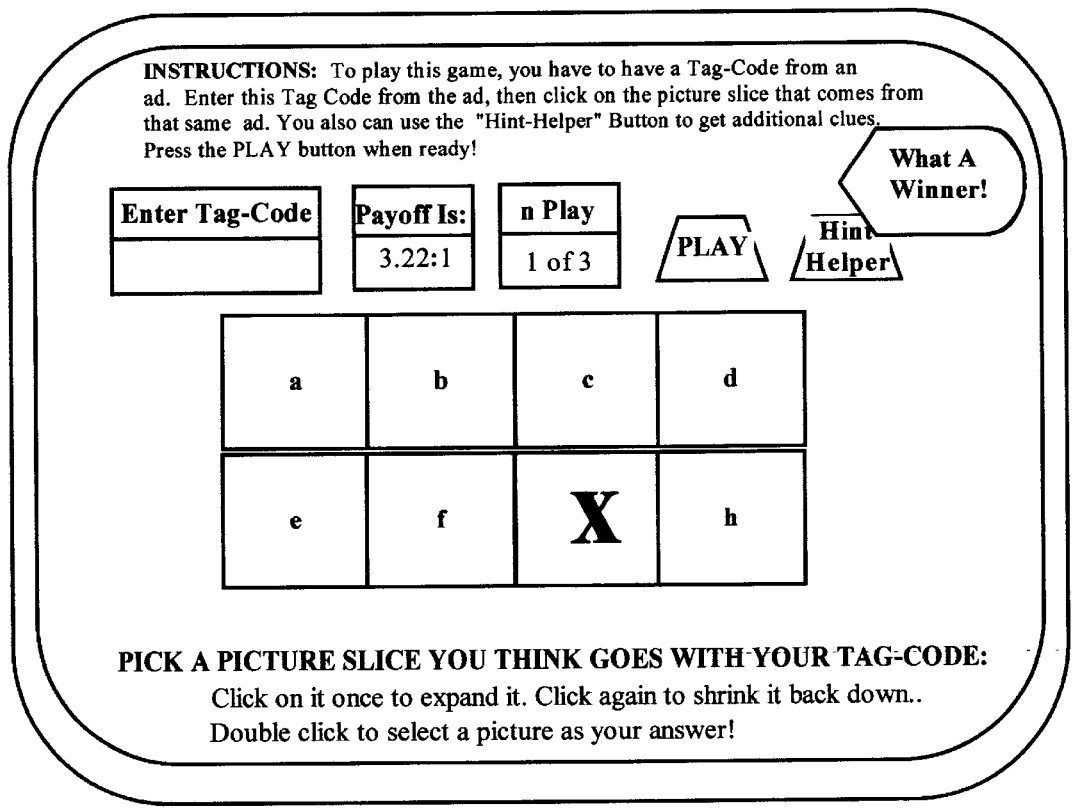

METHOD AND APPARATUS FOR PLAYING ADVERTISEMENT PROMOTION GAME

FIELD OF THE INVENTION

This invention relates to a method and apparatus for playing a game of skill which promotes advertising recognition.

DEFINITION OF TERMS

1. Database—An information source for the storage and retrieval of advertisement segments. When the term is used in conjunction with a computer, it is known as a Relational Database Management System (RDBMS) for the storage and retrieval of the advertisement segments in computer memory.

2. Advertisement segments—A part, portion or slice of a printed, audio and/or visual advertisement.

3. Published advertisements—Advertisements which have been presented to the public.

4. Player—An individual or individuals engaged in playing the game of skill.

5. Sponsor source identification—Conveyed recognition by a player of the trademark owner, promoter, product or service promoted by the published advertisement.

6. A personal identity information question—Questions directed to the player pertaining to information, such as age, gender, culture, name, address and credit card information where applicable.

7. Personalized advertisement segment selections—Advertisement segments selected with regard to format which is tailored to the player.

8. Player registration questions—Identity information questions that pertain to registration information, such as name, age and address.

9. Pre-game wager—Advance payment made by a player for wagering which may be in the form of a credit card payment.

10. Available game format selections—Selections for different game types available for play.

11. Skill level selections—A level of risk and/or skill for available game format selections to be made by a player.

12. Difficulty selections—Selection of the advertisement segments made in proportion to the skill level selected by a player to provide a proportional level of game play difficulty.

13. Game rule playing information—Information provided to a player as to how the game must be played.

14. Coding—Providing the advertisement segments with identification indicia, either written or electronic, or both.

16. Tagging—Attaching either physical or electronic coding to respective advertisement segments.

17. Multiple bit code—A code made up of a group of number or letter combinations.

18. Identification bits—Multiple letter and/or number combinations for providing independent code identification of respective advertisement segments.

19. Personal computer (PC)—An individually owned or accessed computer which includes, but is not limited to, a central processing unit (CPU), random access memory (RAM), persistent storage media, and an interface to a telecommunication network.

20. Local storage device—Random access memory and/or read only memory for a personal computer.

21. Display device—A video screen for a personal computer.

22. Network—A telecommunication network and/or the Internet or the global computer network.

23. Host computer—A computer system used by one hosting the game of skill.

24. Storage medium—A device attached to a computer system which is capable of long-term storage of data. Specifically, the data must persist across power-cycling of the computer system, and through disconnection of the device from the computer system. The device stores or retrieves data as directed by the computer system.

25. Encoded—Transforming information into binary code understandable or transferable by computer.

26. Machine-readable computer program code—Information encoded as defined in the previous definition.

BACKGROUND OF THE INVENTION

Millions of dollars are spent by sponsors to promote their products or services through print, radio, television and the Internet media or global computer network. However, the public, which has been inundated with these published advertisements, develops tendencies to tune out or not pay attention to such advertising, and in addition, the public is often entertained by the advertisement, but fails to identify the advertisement with a particular source, e.g. trademark, product, service, sponsor.

It is therefore a principal object of the present invention to provide a method and apparatus for playing a game of skill which promotes sponsor identification in relationship to published advertisements and which rewards the player with wagering or the like and also provides capability of monetary gain for the host promoting and operating the game of skill.

SUMMARY OF THE INVENTION

In the game of skill of the present invention a database of advertisement segments from published advertisements is generated and selections of the advertisement segments are presented to a player for sponsor source identification. The player then makes identifications of the sponsor sources of the respective advertisement segments presented and these player identifications are then evaluated for correctness and the results displayed to the player.

The game is particularly adapted for the Internet and provides a basis for a potentially profitable host Web site, the owner of which may charge fees to respective advertising sponsors in order to assist in the promotion and tracking of their products or services. In addition, the game of skill of the present invention may also include wagering to encourage participation of players.

Many refinements may be conducted in playing the game. Personal identity questions may be first presented to the player and then the personalized advertisement segment selections made for the presentation as based on these responses. Such personal identity information questions may include player registration questions and also include the reception of a pre-game wager from a player.

Different game formats may also be presented to the player for selection and the selection of the presentation of advertisement segments may be made in accordance with these format selections. In addition, the player may also be presented with skill or risk level selections and based on the skill or risk level selections made by the player, the level of difficulty is accordingly made for the selections to be presented to the player of the advertising segments. If wagering is involved, then a winning player is rewarded with money or another type of reward. Game rule playing information is also generally displayed to the player prior to presenting the selections to the player so that the player has full knowledge as to how to play the game prior to engagement.

In order to organize the storage and retrieval of advertisement segments for playing the game, they are coded as by tagging each advertisement segment with a multiple bit code which for example includes identification bits for the sponsor, the year the advertisement was published and the sequence in which the advertisement was published in that particular year.

BRIEF DESCRIPTION OF THE DRAWING

Other objects and advantages appear hereinafter in the following description and claims. The accompanying drawings show, for the purpose of exemplification, without limiting the invention or appended claims, certain practical embodiments of the present invention wherein:

FIG. 1 is a glossary of symbols and legends used for diagraming the flowcharts of the figures which follow;

FIG. 4 is a flowchart illustrating the dynamic database process interacting with the general program flow for the game of skill of the present invention;

FIG. 6 is a flow chart illustrating the opening page and identification registration portion of the game of the present invention;

FIGS. 9A and 9B are connected flowcharts illustrating formal choices which may be selected by a player for the game of the present invention;

FIGS. 10A and 10B are connected flowcharts illustrating that portion of the game of the present invention wherein the game parameters are selected by a player;

FIGS. 16A, 16B and 16C are connected flowcharts which illustrate a simulated screen example as to how one particular game known as tag code is presented to a player.

DETAILED DESCRIPTION OF THE PREFERRED EMBODIMENTS

Figure 2:
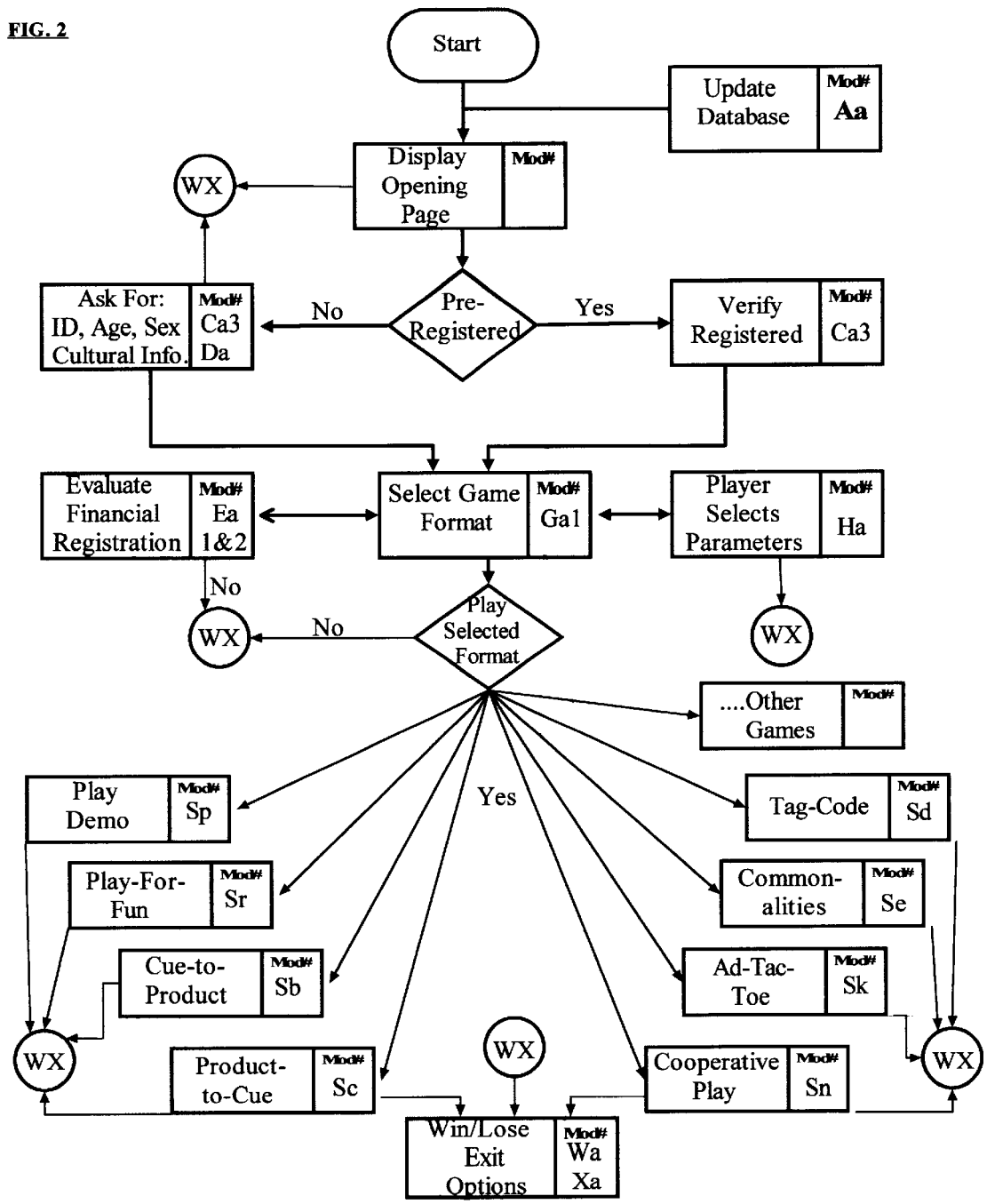
FIG. 2 is a simplified process flowchart illustrating an overview of the game of skill of the present invention.

The game of the present invention is a personalized game of skill designed to promote advertisement recognition to the benefit of advertising sponsors. In its most basic form, the game of the present invention requires the generation of a database of advertisement segments from published advertisements, then presents selections of the advertisement segments to a player for sponsor source identification. The player identifications are then received by the game host, evaluated for correctness and the results are displayed to the player.

Accordingly, the game may ask two or three types of questions—"Do you remember the commercials you have seen or heard?" or, "Can you figure out a winning strategy based on what you have noticed and remembered?". The potential player is presented with this approach and then further encouraged to play the game by indicating that there is a reward or that they could win large sums of money or possibly credits exchangeable for gifts. Another question which may be presented is "Can the player make changes in this flexible game to better accommodate his/her risk tolerance?"

With regard to the issue of wagering, the game of skill of the present invention is not considered to be gambling under the law wherein chance alone controls the way winning occurs. If the player can recall what product, service and/or company was being marketed in a particular advertisement, the player has an opportunity to gain financial reward. This provides an opportunity to encourage those who are less interested in advertising or to listening to advertising, or who tend to ignore advertising to become more attentive to advertising. This is a service for which sponsors will be willing to pay the game host thereby creating an Internet Web site or game show which can be financially profitable. In addition, wagering monies may also be received by the game host from the player.

The game of the present invention also provides an additional opportunity to present advertising surveys to the public in a format wherein the public will be encouraged and interested in responding to the survey questions, thereby providing a valuable market research tool.

The game of the present invention may also be personalized to the players by allowing the player to choose much of the content and process elements that constitute the game's challenge. For example, the player may choose the following game parameters: risk or skill, payoff potential, accommodation to player's characteristics, classification of product or service, the manner in which the game is presented, difficulty level, facilitation factors, and the manner in which the player may respond. In addition, the player may select different game formats or game types from a list.

The game of skill of the present invention is best exemplified and described through the use of flowcharts in order to readily illustrate how the game is played and/or to also signify to a computer programmer of ordinary skill in the art as to how software may be written so that the game may be played through the use of computers. Accordingly, attention is directed to FIG. 1 which illustrates or shows the symbols used for diagraming the flowcharts in the following figures. These symbols utilized are verily standard symbols generally used for process flowchart diagraming.

In studying the process flowcharts illustrated for the present invention, two points should be emphasized. Modules and caller references are intended to help readers track the logical flow of the program from the basic design. Modules are blocks or integrated collections of procedures designed to accomplish a specific outcome and are elaborated on the respective drawings. Programming blocks designated by "sub#" may be given a unique designation within a flowchart without a separate figure designation and indicate fairly routine, unelaborated processes which need to be addressed. The term "CALLER" indicates where a program Module is called from and to where it should return when the specified purpose is accomplished.

FIG. 1 accordingly provides a key or glossary of flowchart symbols and legends which may be referred to as required for interpreting the flowcharts presented in the remaining figures.

The process flowchart of FIG. 2 provides a simplified overview of the game of skill of the present invention. All of the flowcharts presented in the present specification by way of the drawings should be self-explanatory to those of ordinary skill in the art, with particular reference to the glossary or key of FIG. 1.

In brief, the game is built around one's ability to recognize segments, "slices" or frames of a published advertisement, for example a TV commercial, and recall what product, service, sponsor and/or company was being advertised.

As may be seen from the flowchart of FIG. 2, the opening page displayed to the player directs the player through registration procedures and thereafter presents possible game format choices for the player. Format choices may be made directly by the player or indirectly through selection of parameter options, and the player is presented with an array of possible game formats which may be played.

For example, player selection of format may be accomplished through registration information revealed by the player regarding age, gender, cultural ties, category selections and difficulty level selections. These selections may then be coordinated with the players picks or selections of the particular game the player desires to play and the formats for those games may be made easier or more difficult with associated rates of payoff or risk for winning in accordance with this registration information submitted by the player.

While the game of the present invention is designed for computer use, and particularly for computer use for the Internet, it is also envisioned as an action game involving sequences of choices for relating advertisements and sponsors, or a television game show contest with studio audience participation while projecting the game for general viewing or for differential viewing by the contestant and the audiences. In this way, each of these groups may be competing or playing cooperatively with each other.

The remainder of the figures present flowcharts which will detail and expand on specifics or portions of the game process illustrated in the overview of FIG. 2.

Figure 3:
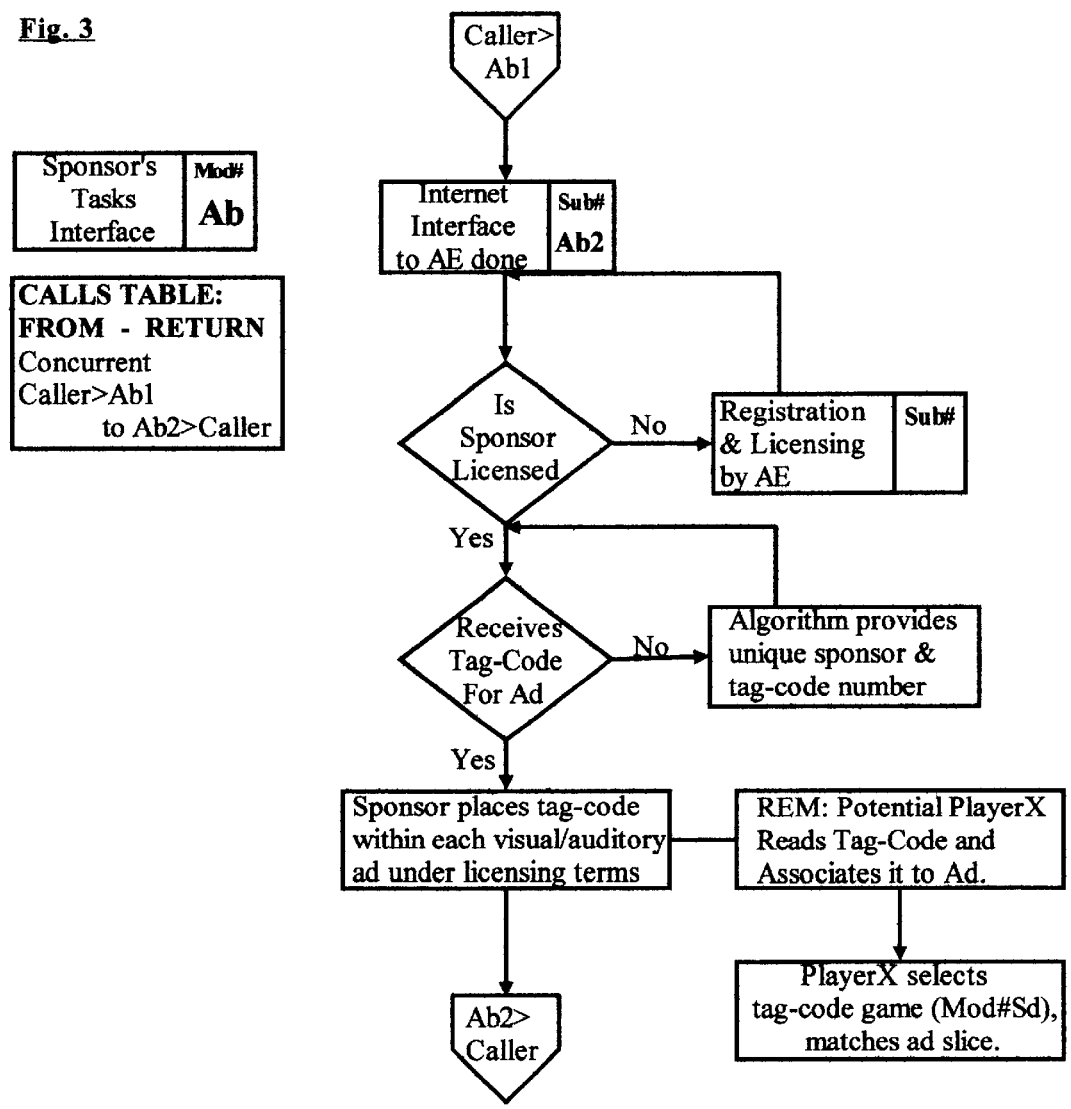
FIG. 3 is a process flow chart illustrating the procedures to be accomplished for sponsor tag-coding of advertisements.

The flowchart of FIG. 3 illustrates the sponsor's tag-coding and interfacing with the database. This flow chart illustrates the involvement of sponsors of various kinds becoming licensed partners and agreeing to display the tag-code in a certain way within their commercials or advertisements. Each such sponsor will have a unique code to which a unique number will be added reflecting their particular advertisements. An interface is provided which allows for the automatic processing of exchanges between the host computer (AE) and sponsors, such that the sponsor license is checked and/or registered and an approved tag-code provided to the sponsor. This tag-code is then the identifier that is used by potential players to identify a specific advertisement, for example by sponsor, the year the advertisement was published and the sequence in which the advertisement was published in that particular year, when they play a specific game of the present invention known as Tag-Code which will be explained in detail hereinafter.

The flowchart of FIG. 4 elaborates two main features of the game. First there is a parallel dynamic database process interacting with the general program flow. This process handles the dynamic creation of a repository of data, its coding, and retrieval for the rest of the program. Second, it indicates that the sources of information to be stored in this database can, in part, utilize an automatic interaction with sponsors of information such as advertisers, media marketers (e.g. Sub#A4 and A5), or the host in-house creative staff which supply information, such as commercials and their related historical information for the processed results from those commercials by which the advertisements are cut into segments or slices and coded (e.g. Sub#A7). In the ongoing game, player behavior (e.g. Sub#A6) is also coded and added to this database, much of it in connection with these advertisements as in "Sub#A3". The resulting database (i.e. Sub#A8) is the source of information from which the game elements are extracted according to the choices of games and parameters set by the players. The player's outcome is acknowledged and the player is asked to give exit impressions for credits and asked if the player would like to try again. If a negative is received, the game is terminated with an appropriate "thanks".

Figure 5A:
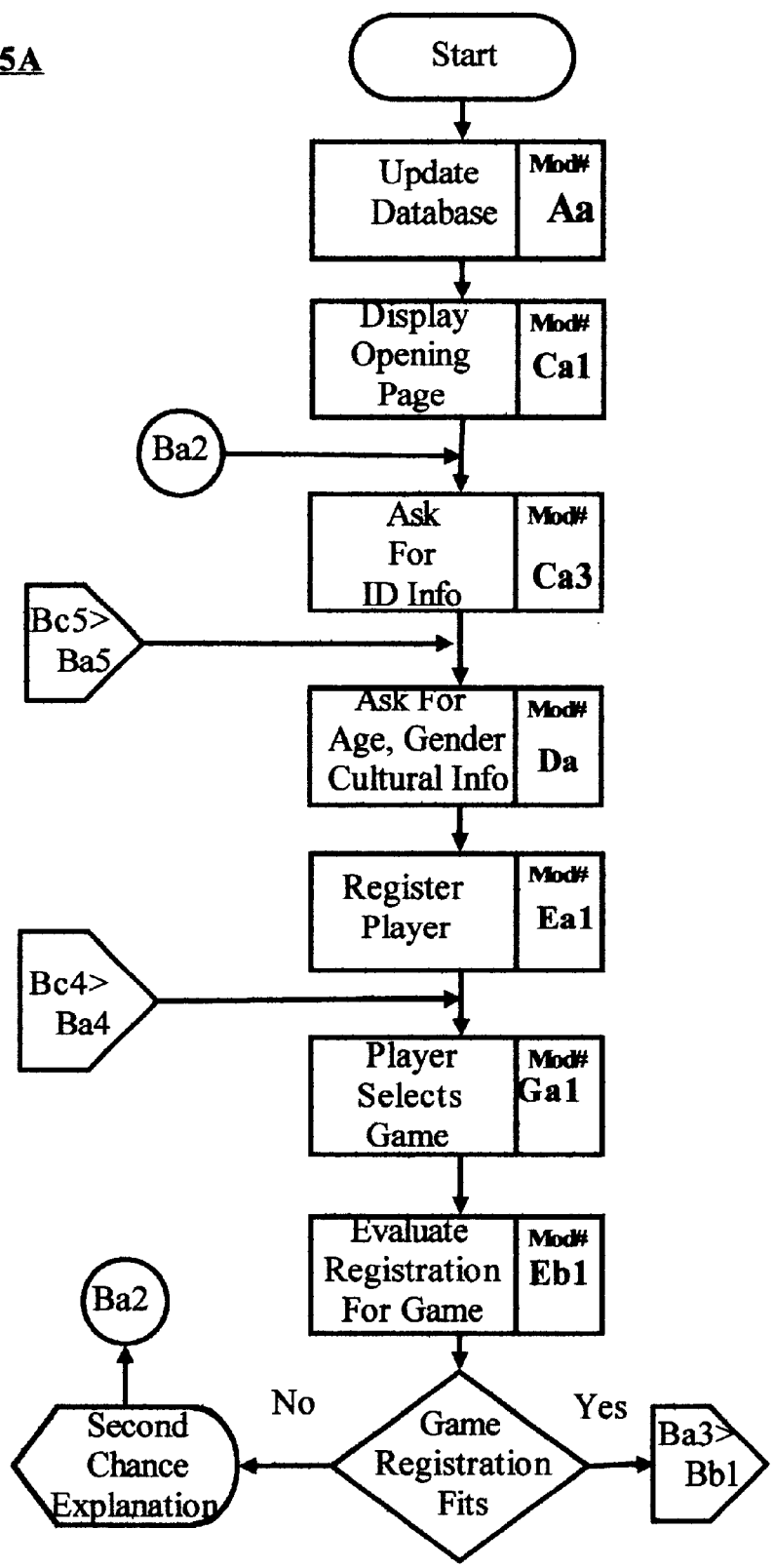
FIGS. 5A, 5B and 5C are connected flowcharts which summarize the logical overview of the entire flow of the process of the present invention.
Figure 5B:
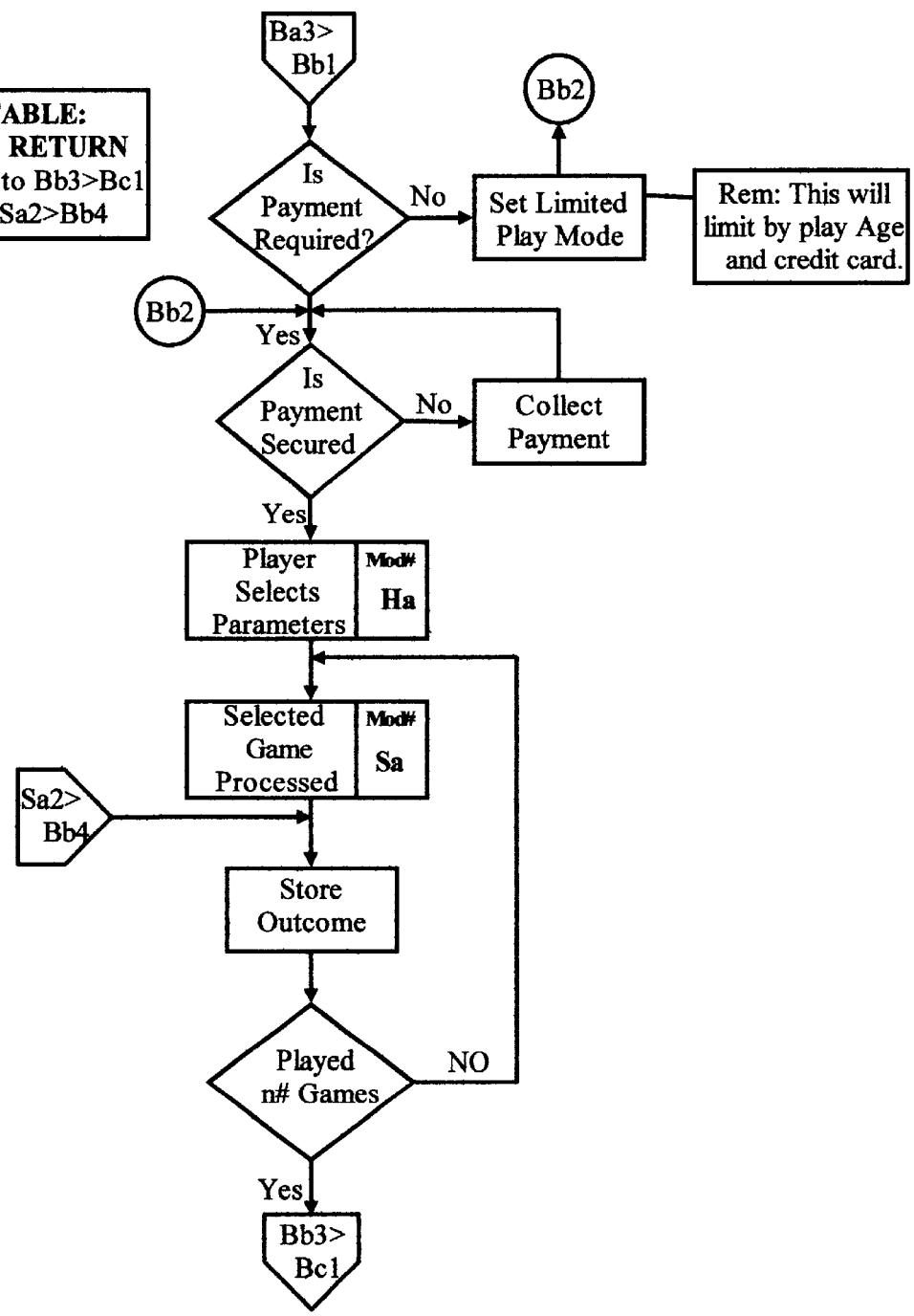
Figure 5C:
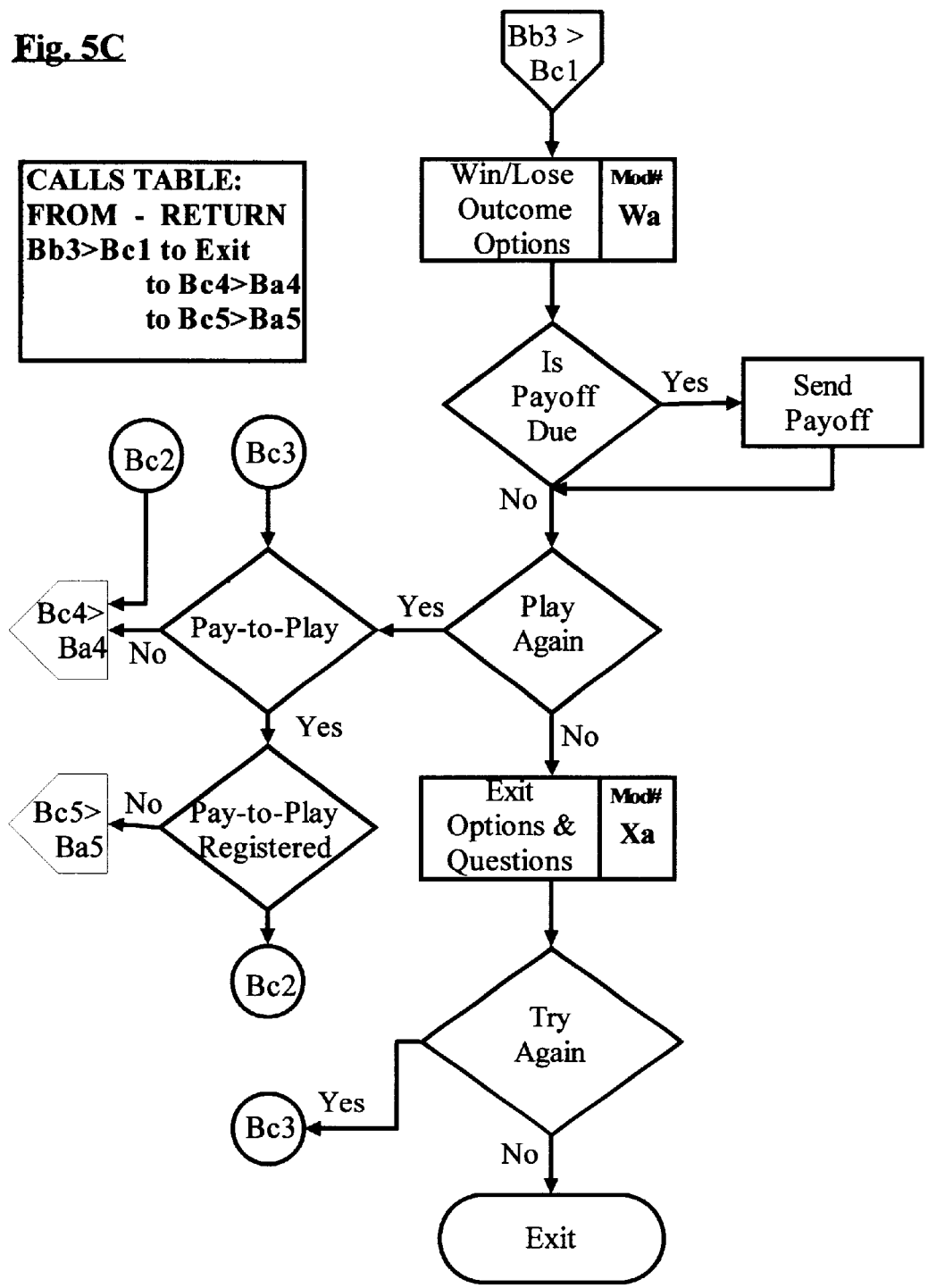

The connected flowcharts of FIGS. 5A, 5B and 5C provide a logical overview of the game of the present invention and summarize the entire flow of the process and reference the elaborated Modular processes shown in the other figures. The steps in the process include:

Aa—Setting up and maintaining the underlying database.

Ca—The display of an opening, attention getting, introductory page which asks for (Ca3) minimal information of identification, particularly important for differentiating first time versus prior players.

Da—Asking for information on age, gender, and culture which permits the supply questions and formats to be more tailored to the player, so that, for example, advertisements in action movies might be used for men, and advertisements from soap operas for women.

Ea and Eb—Register a player who wishes to pay via credit card to play the more challenging games and who hopes to be reimbursed should the player win. This requires a player to be 18 or accompanied by someone who is 18 years of age. More detailed information is sought here for tracking and further profiling purposes. Eb checks to make sure that a person is appropriately registered at the level for the game they have requested to play. If not, the player is sent back to gather the additional information.

Ga—Player selects a game type or format they wish to play. There are 14 different formats from which to choose. Two of these are actually restricted versions, Demo and Play-for Fun, of the other 12 games. After registration is checked and payment secured if the person wishes to Pay-to-Play the more challenging versions of the games, the selected game has its parameters set (Ha) by the player before it is actually presented to the player (Eb).

Ha—The player can choose the level of risk for winning versus losing by setting some seven types of parameters that control from where the data comes. The game's source of information, mode of presentation (i.e. A/V, still v. sequential), manner of presentation (i.e. distorted, distracted), categories or difficulty of segments or "slices", can all be set by the player for the given game chosen. This creates a highly customized game for each player.

Sa—The game is "processed" or played by the subscriber-player. Game plays will be sold in subscriptions of "n" number of trials, say 3 repetitions. The results are stored after each play until the subscribed number has been achieved.

WA—The results of play are evaluated to determine won/lost status and to give credits for games played for future considerations.

XA—Acknowledges the player's outcome, asks the player to give exit impressions for credits, and asks if the player would like to try again. If a negative is received, the game is terminated with the appropriate "thanks".

The flowchart of FIG. 6 illustrates the opening page and identification registration. This flowchart is divided into two sections, the first is intended to be very interesting and inviting to the player while the section starting with C3 asks for identification information, Password and e-mail verification if a returning player, or asks for this information if a first time player.

Figure 7:
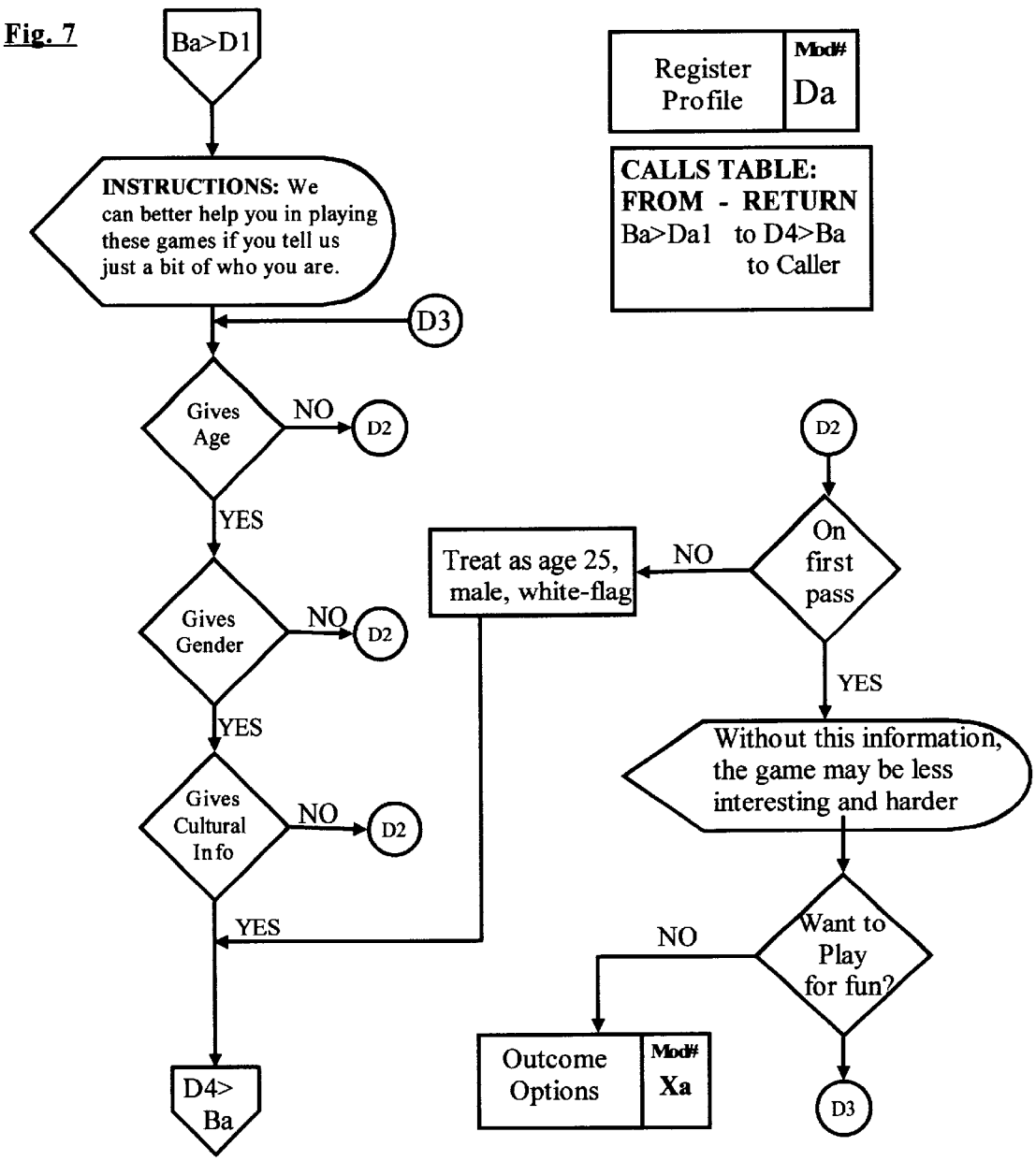
FIG. 7 is a flowchart illustrating the player profile registration portion of the game of the present invention.

The flowchart of FIG. 7 illustrates profile registration. This Module asks for age, gender, and cultural orientation. The latter includes language, country, or subgroup affiliation so that advertisements with these foci may be utilized. This is especially useful when dealing with international markets. If the person does not initially desire to give this information, a further explanatory segment is presented and a second request for the information is made with an indication of what the "default" setting will be.

Figure 8:
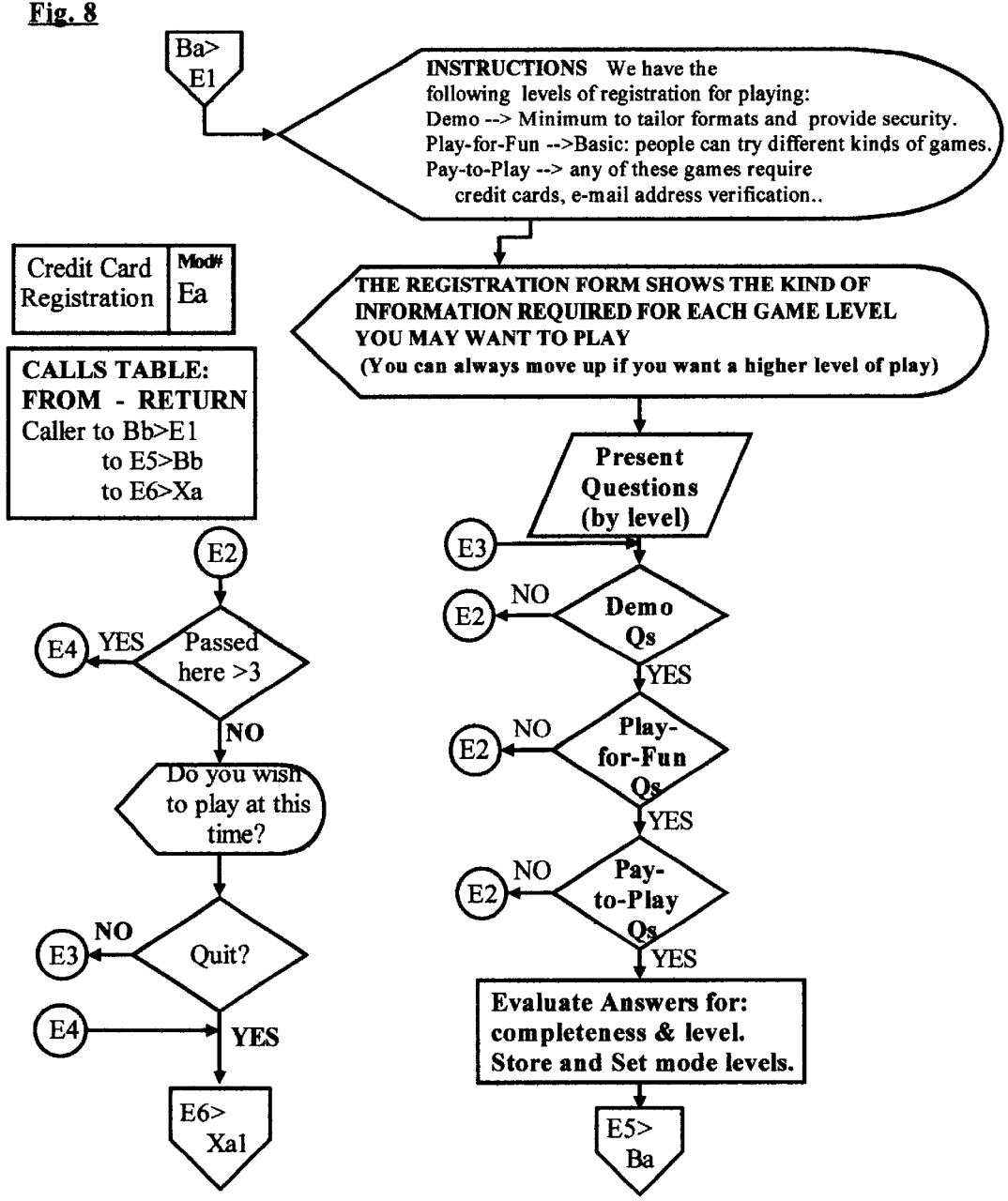
FIG. 8 is a flowchart illustrating the player credit card registration portion of the game of the present invention.

The flowchart of FIG. 8 shows the process portion of the game of the present invention for credit card registration. The purpose of this Module is to insure that payment is secured from the player before allowing further play if this type of option has been chosen in prior player selections. Playing at the demonstration (DEMO)NSTRATION and Play-for-Fun level, only requiring passing the identification or ID plus Password, but the materials or advertising segments used will be made interesting and kept current, but will be less challenging.

Figure 9B:
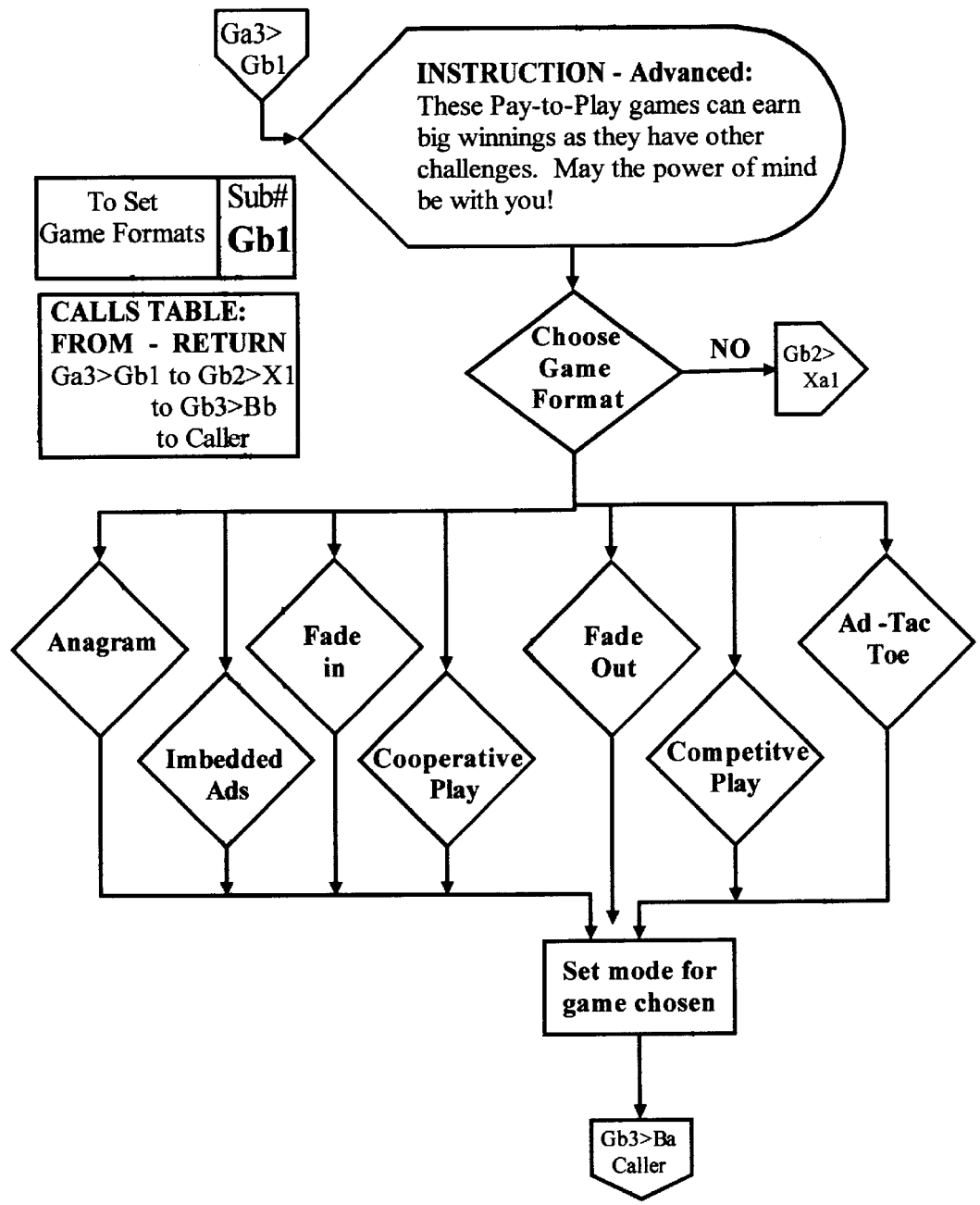

The connected flowcharts of FIGS. 9A and 9B illustrate the process for format choices for games which may be played. There are fourteen game choice formats from which players can choose. These game formats will be discussed in greater detail hereinafter.

Two of these, DEMO and Play-for-Fun are actually ways of playing the other games under restricted conditions and do not actually provide new formats. All of these games explicitly focus on one's ability to recall the relationship between advertisement and product or service. However, additional game skills may be added on to this base for example to gain advertising survey information.

The player selects which game to play or can review the nature of any game by clicking the "to be selected buttons" with the "right hand mouse". This displays the Instruction Set for each of the games as described in "S" Modules discussed hereinafter.

Figure 10A:
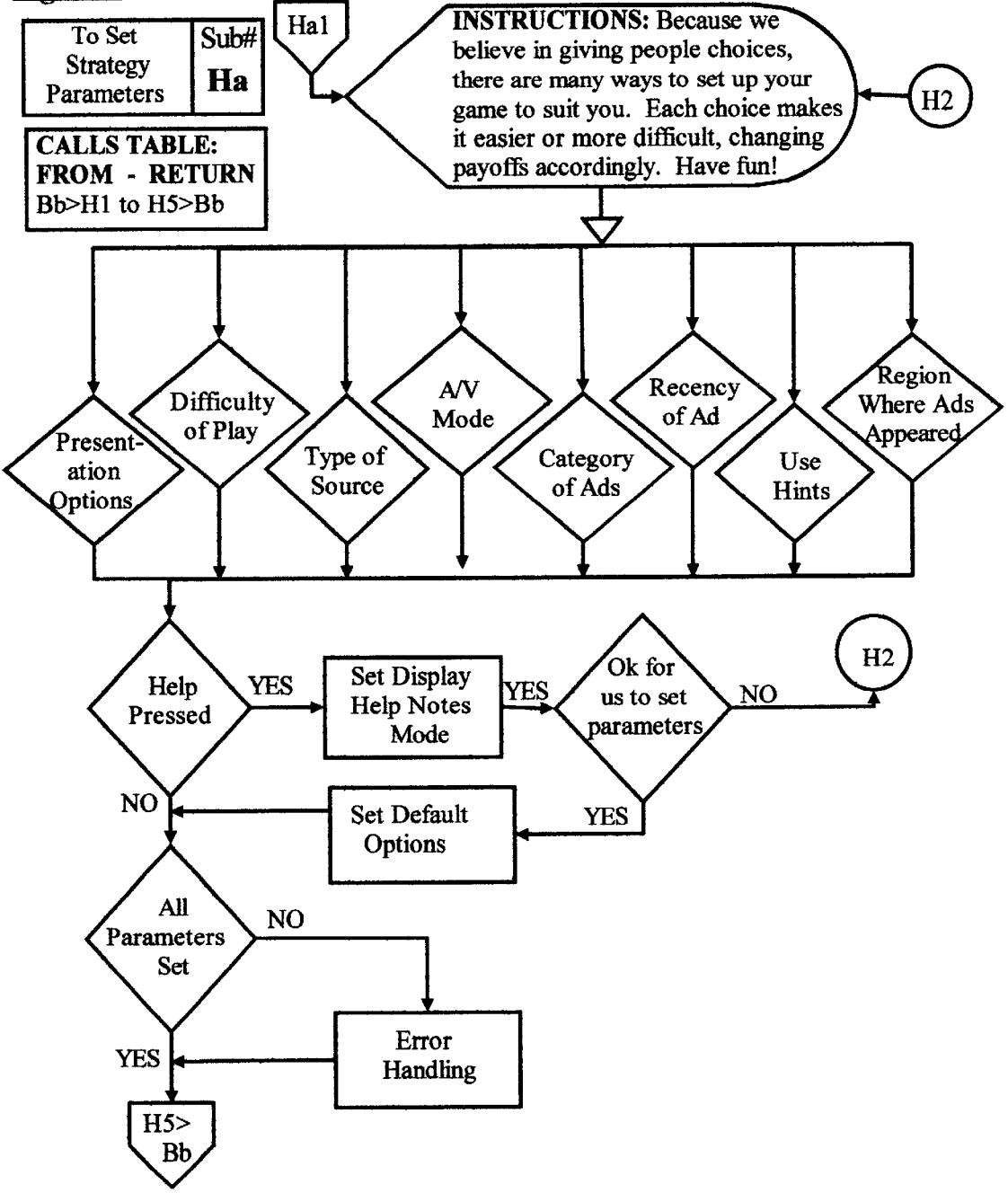

Connected flowcharts of FIGS. 10A and 10B illustrate the process for picking game parameters in the method of playing the game of the present invention. Once the game has been selected, there are many ways in which it can be created within the selected format. There are eight classes of parameters within which a player can make choices or the player can simply bypass this added task of setting the parameters and elect the default settings. Each setting makes the game easier or more difficult and, therefore changes the Payoff Rate. These parameters include setting the:

Difficulty level.
Audio and/or visual kinds of advertising material (e.g. radio or TV).
Recency of the advertising appearance.
Region from where the advertisement was presented.
Presentation manner, e.g. extortion and distraction.
Type of source.
Category of advertisement, such as sports.
Use of hints to aid in winning.

Figure 11:
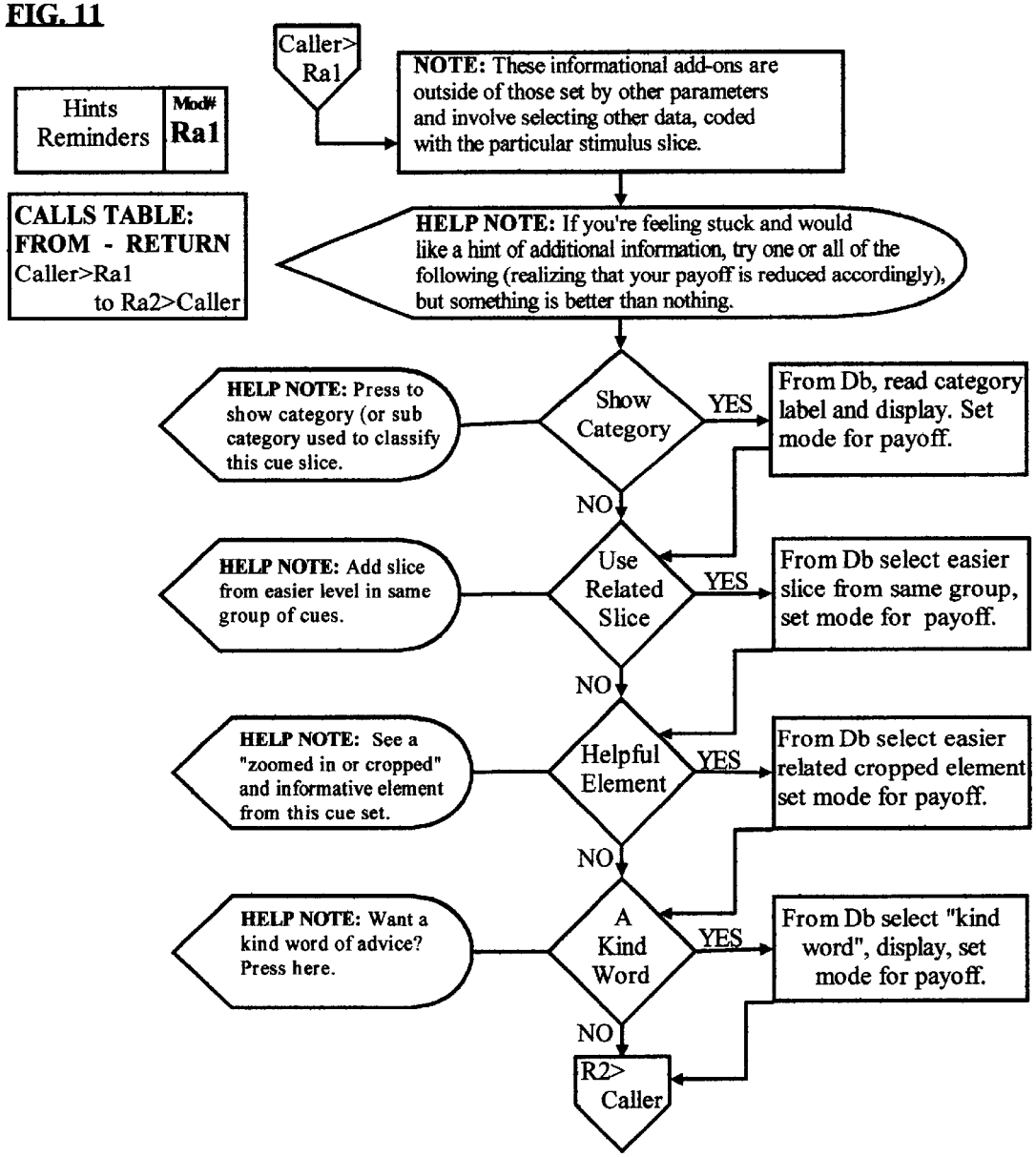
FIG. 11 is a flowchart illustrating the module or portion of the game process of the present invention which submits hints and reminders to the player.

These parameters have been operationally defined for setting up automatically how the game can be played. FIG. 11 illustrates the flowchart for the Hints and Reminders Module.

This Module is part of the parameter list but differs in that it provides additional information rather than changing the factors used in processing the game format. That is, the player asks to know what category of advertisement which the player is dealing with unless this "Hint" information is asked for. On the other hand, another parameter can be set to select easier or more difficult segments from the advertisement section. Also, as is seen in the "S" Modules, the R Module may be called from many places for the respective games whereas the Parameters are set before the game series begins and is not changed.

Figure 12:
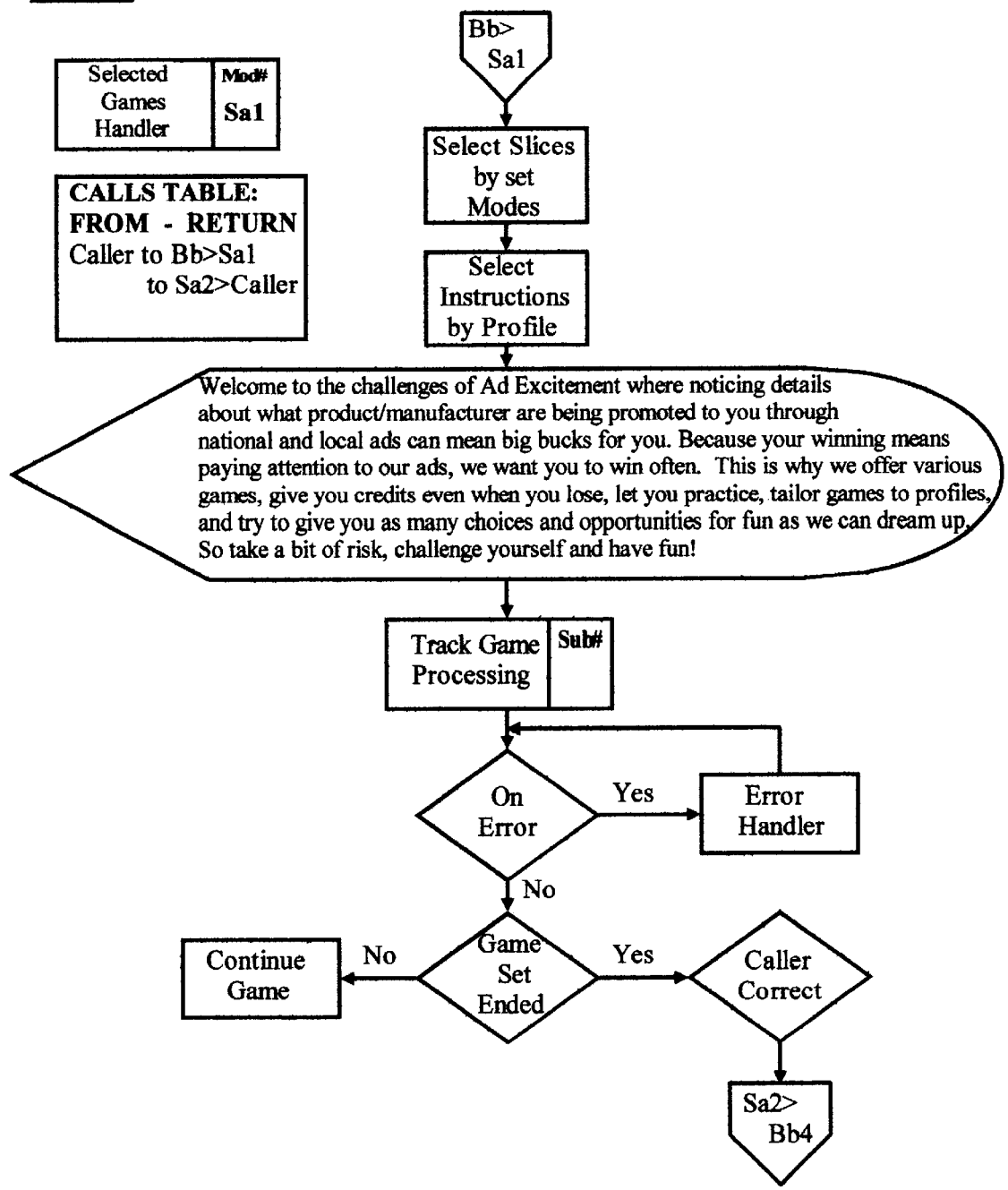
FIG. 12 is a flowchart illustrating the process for the selected game handler modules of the game process of the present invention.

The flowchart of FIG. 12 illustrates the game process portion for the selected game handler Module. This is a housekeeping Module in that it manages four general functions:

Integration of the specific game format chosen with the profile of the player and the parameter configuration selected by the player.

Introduction of the general play for all games and the rules of play while encouraging participation.

Handling of the tracking of which game is being called from the general program as shown in FIGS. 5A, 5B and 5C.

Ensuring that the flow is returned to the Caller point when the specific game has been processed.

Figure 13A:
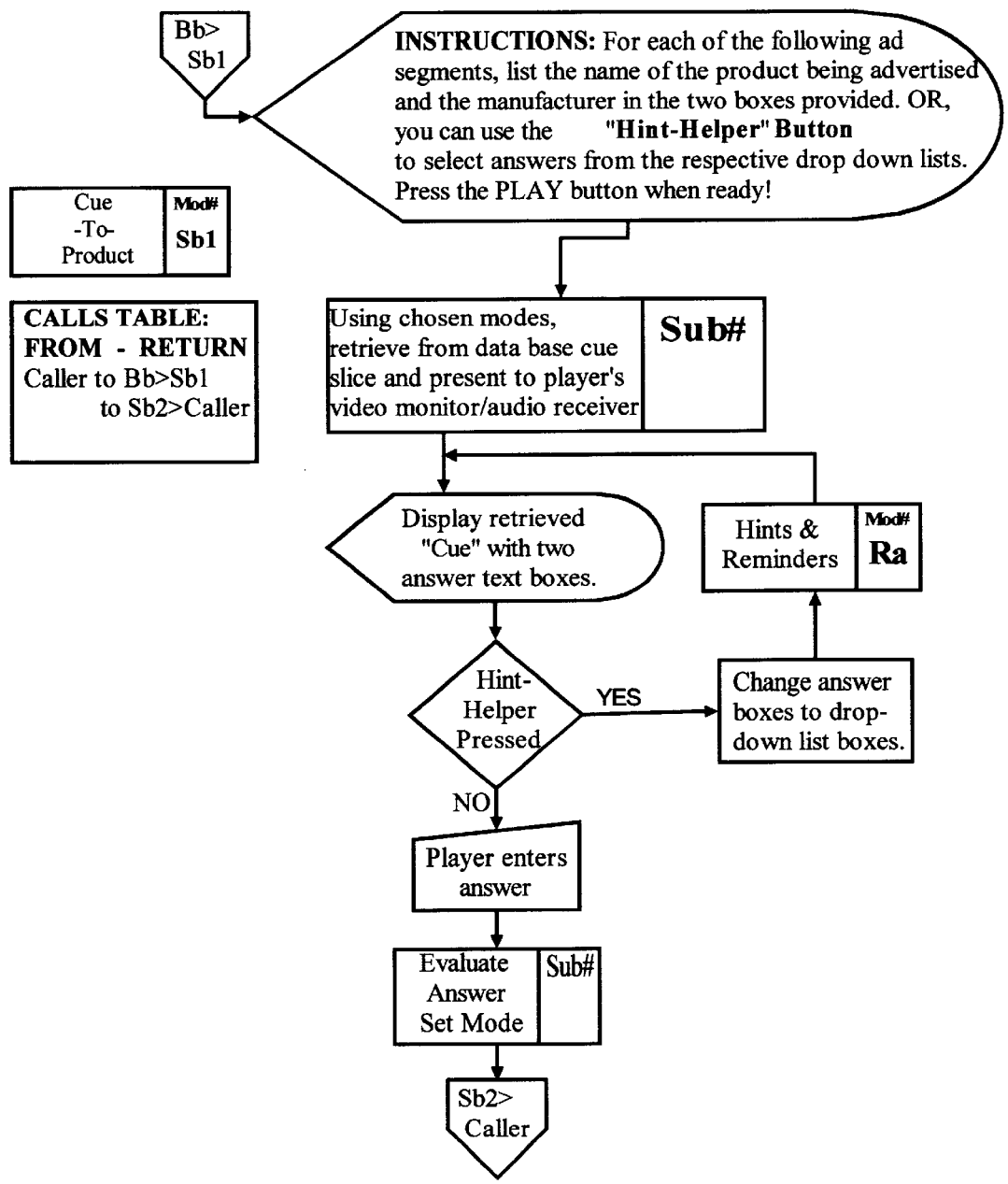
FIGS. 13A through 13P are flow charts which respectively illustrate different possible game format selections for the game of skill of the present invention.
Figure 13D:
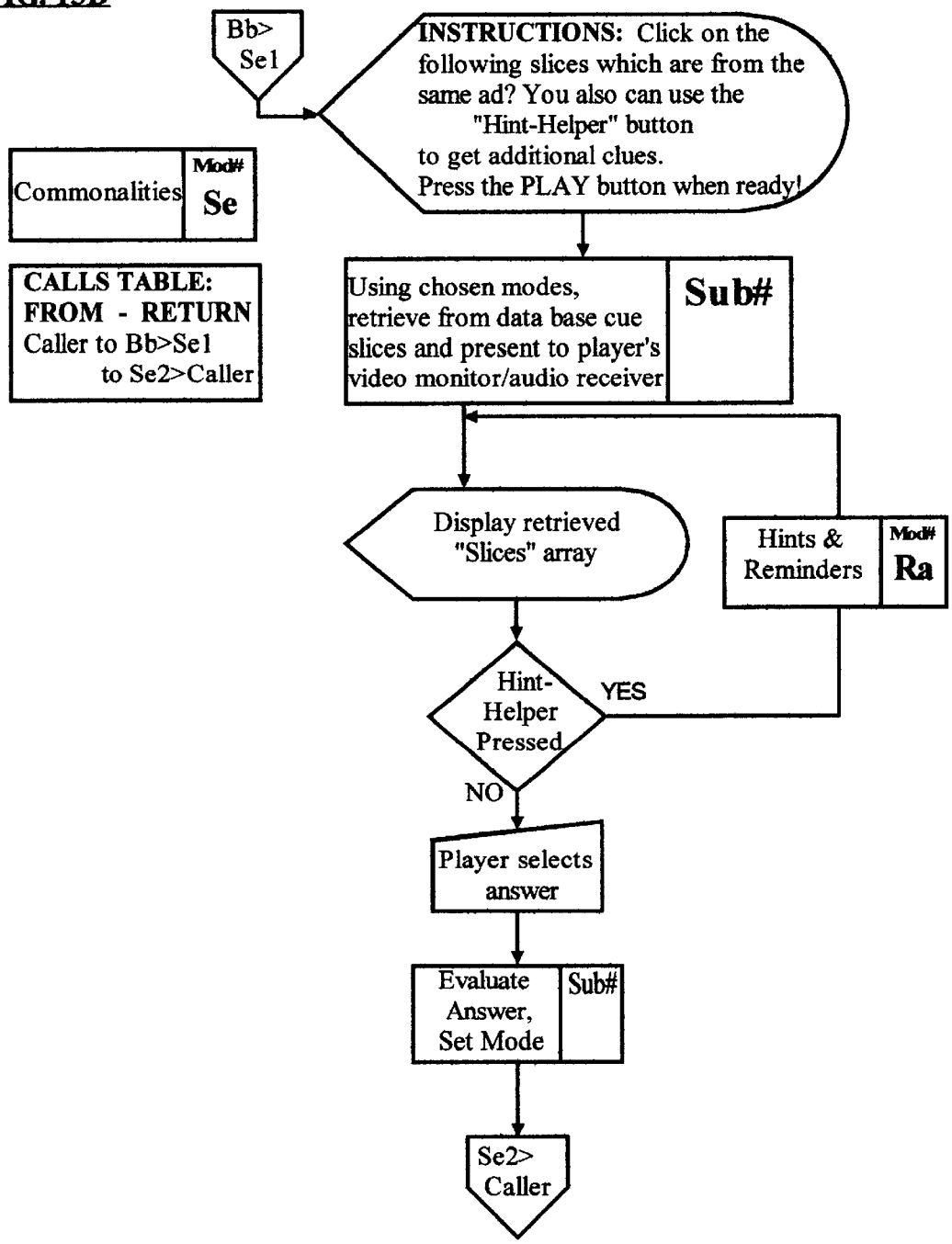
Figure 13G:
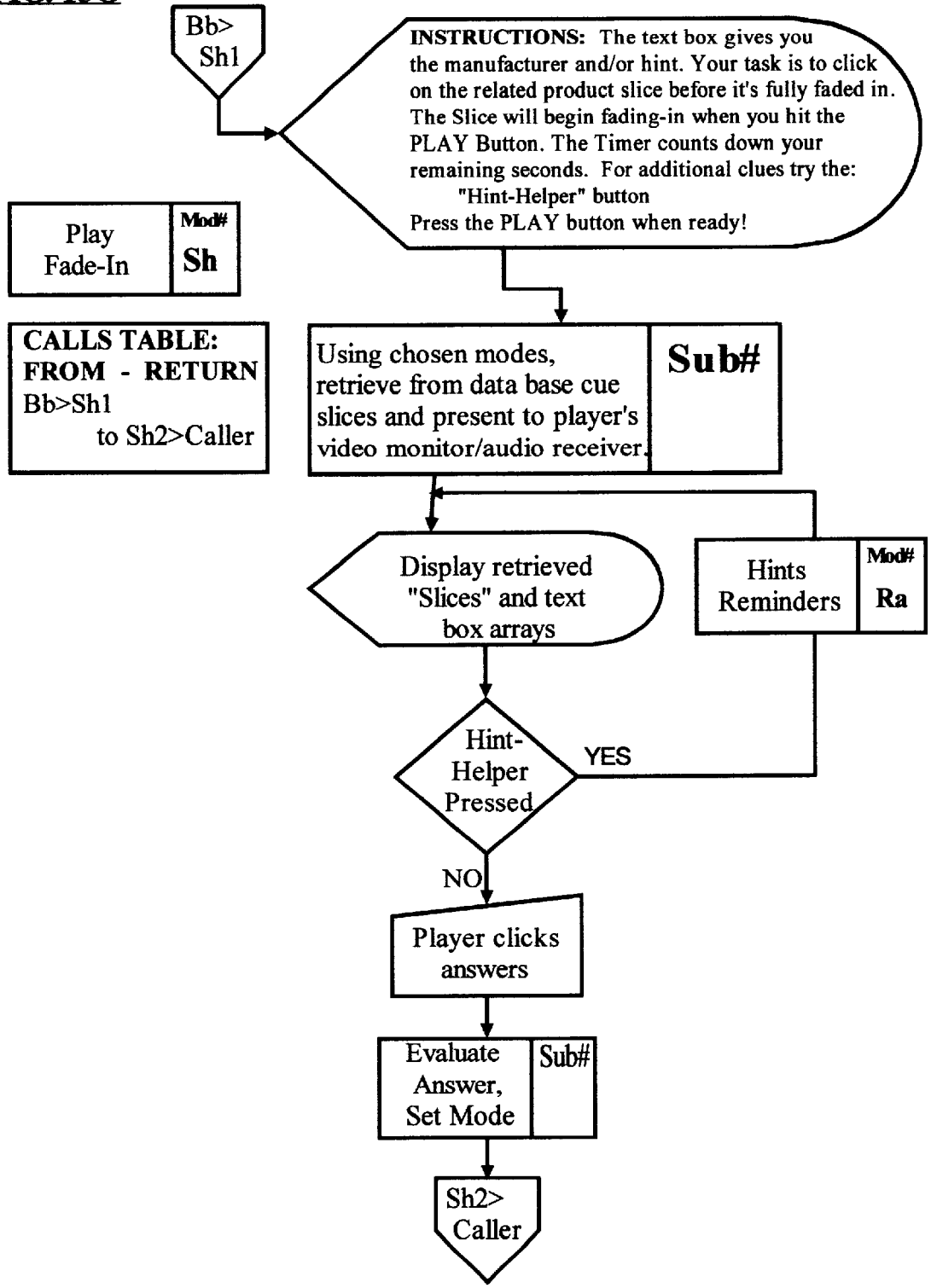
Figure 13H:
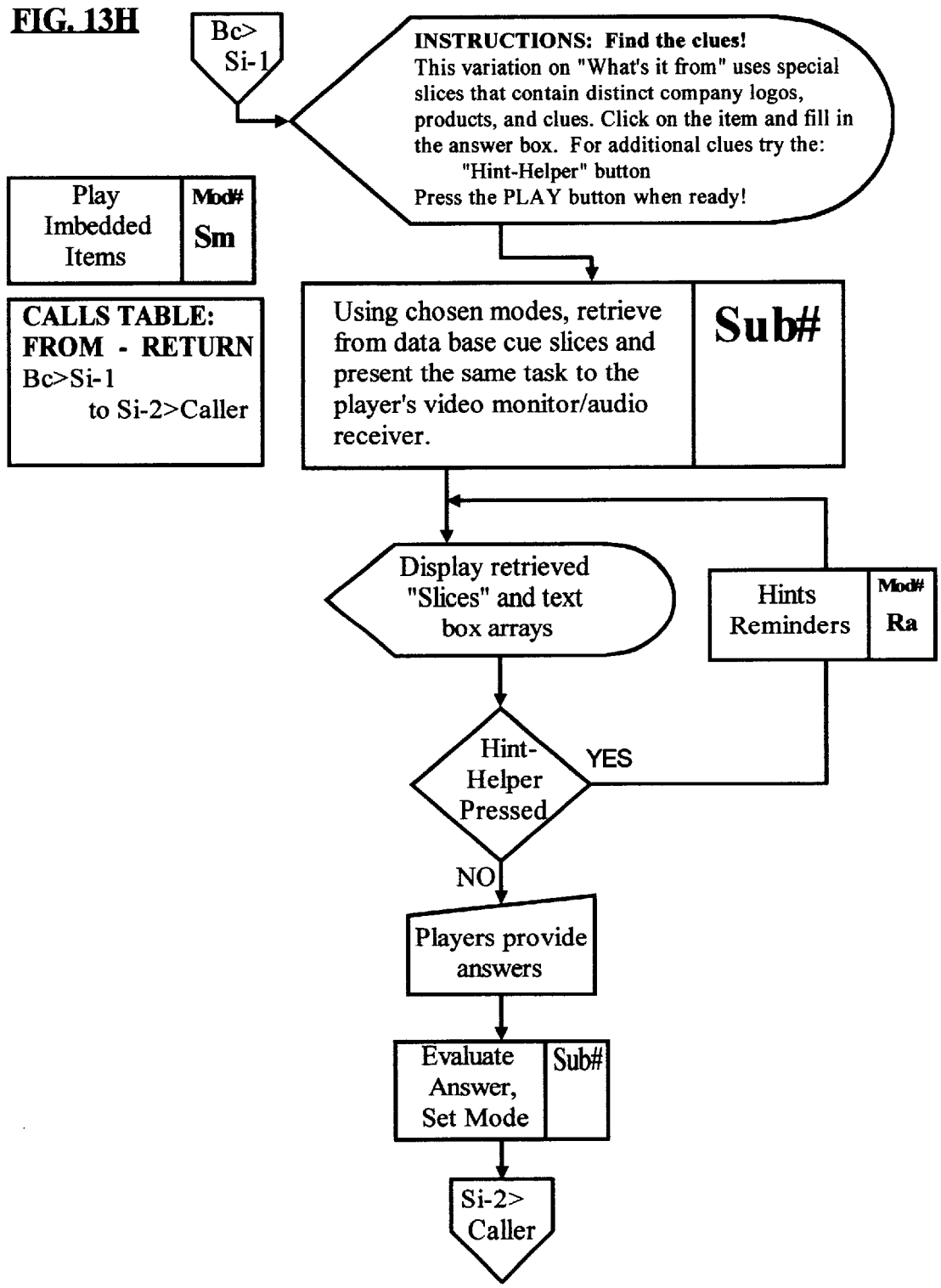
Figure 13J:
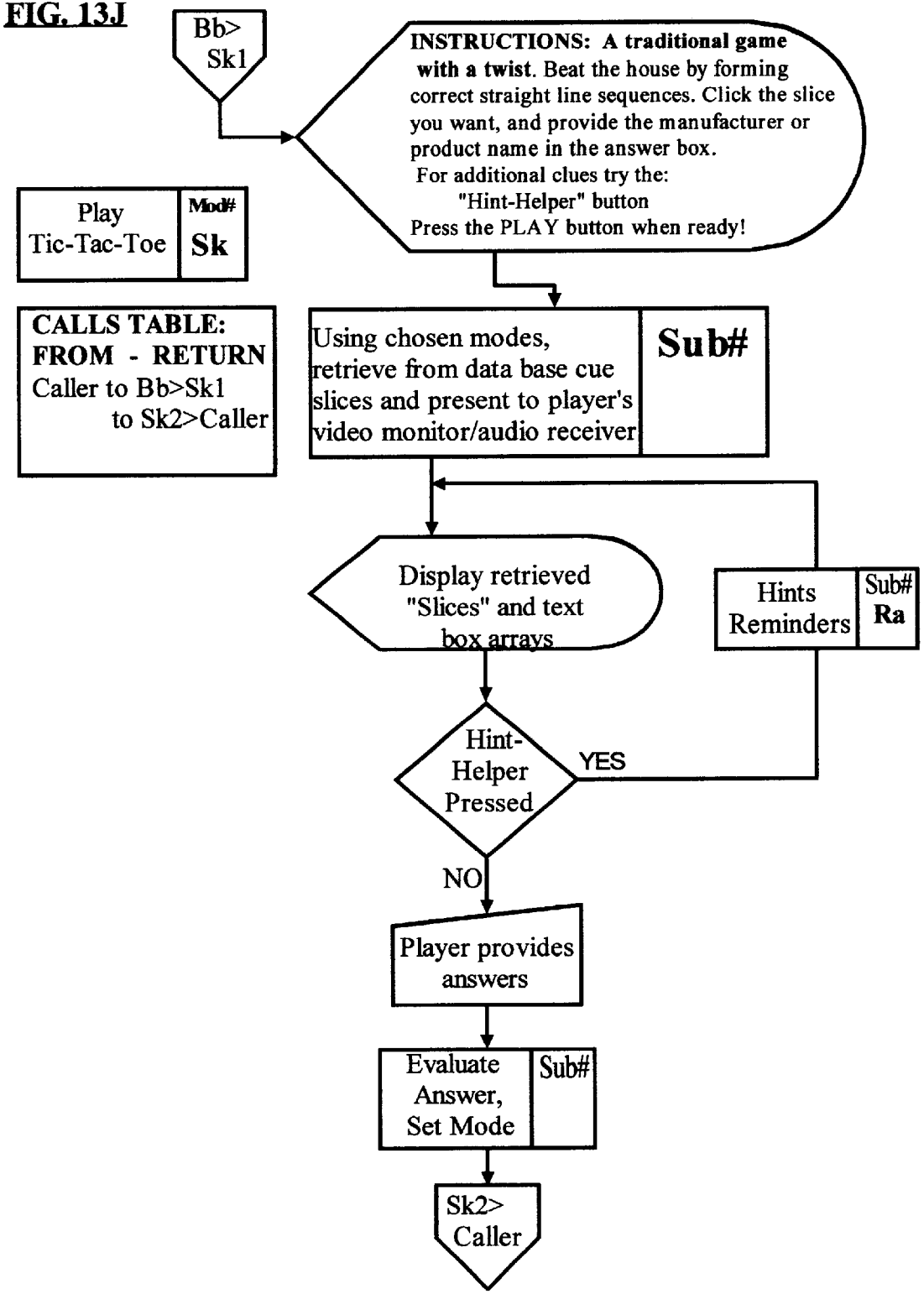
Figure 13K:
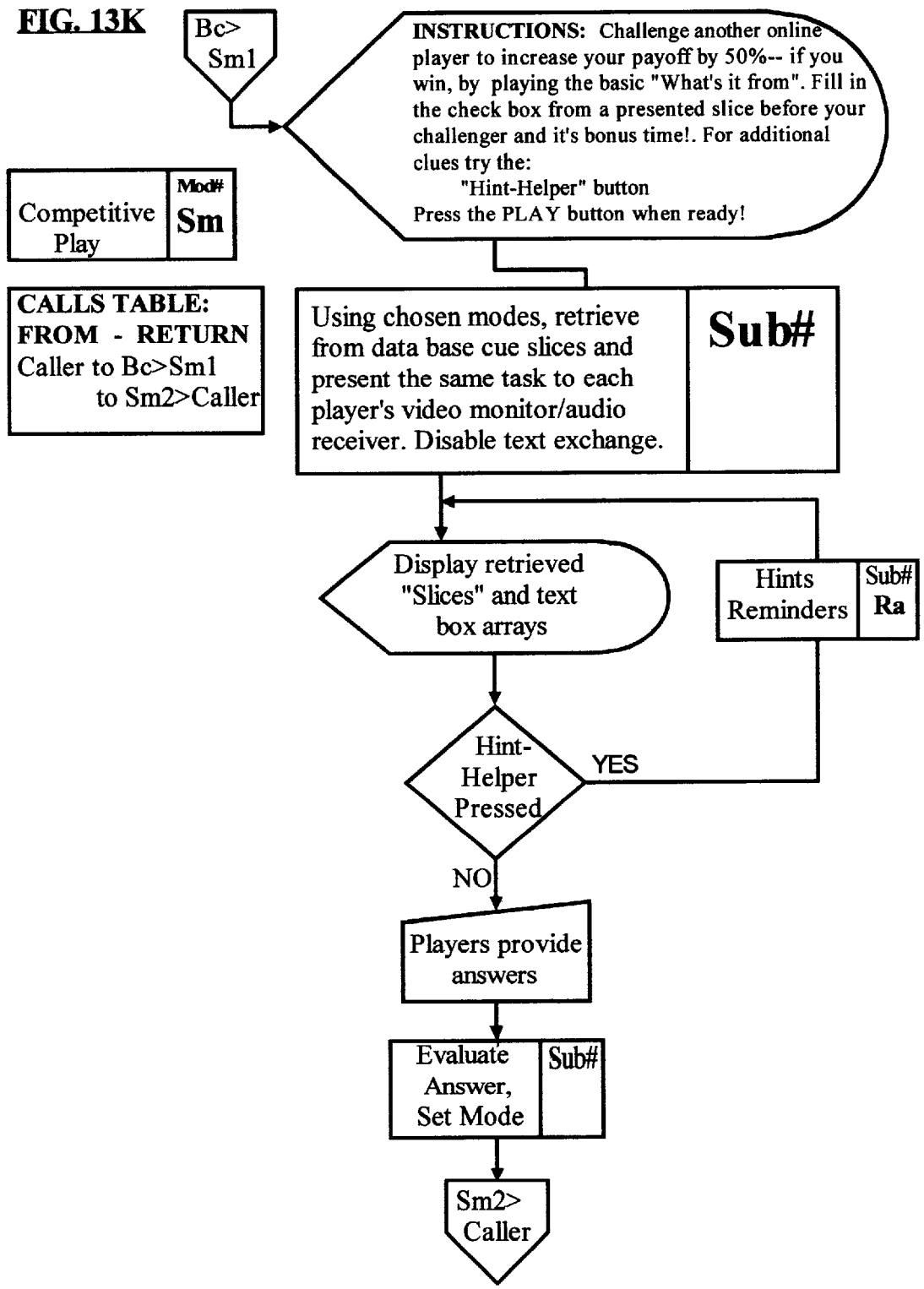
Figure 13L:
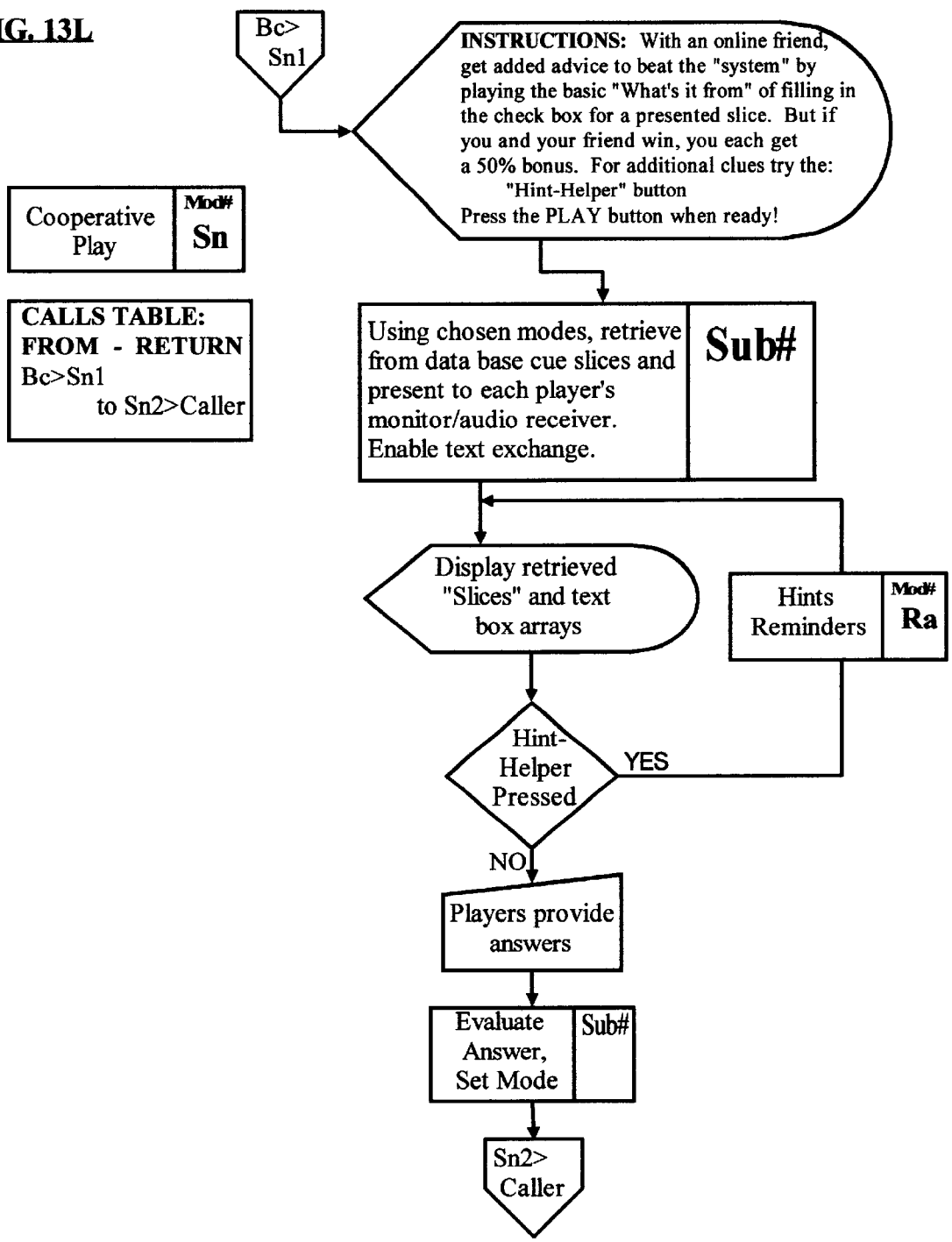
Figure 13M:
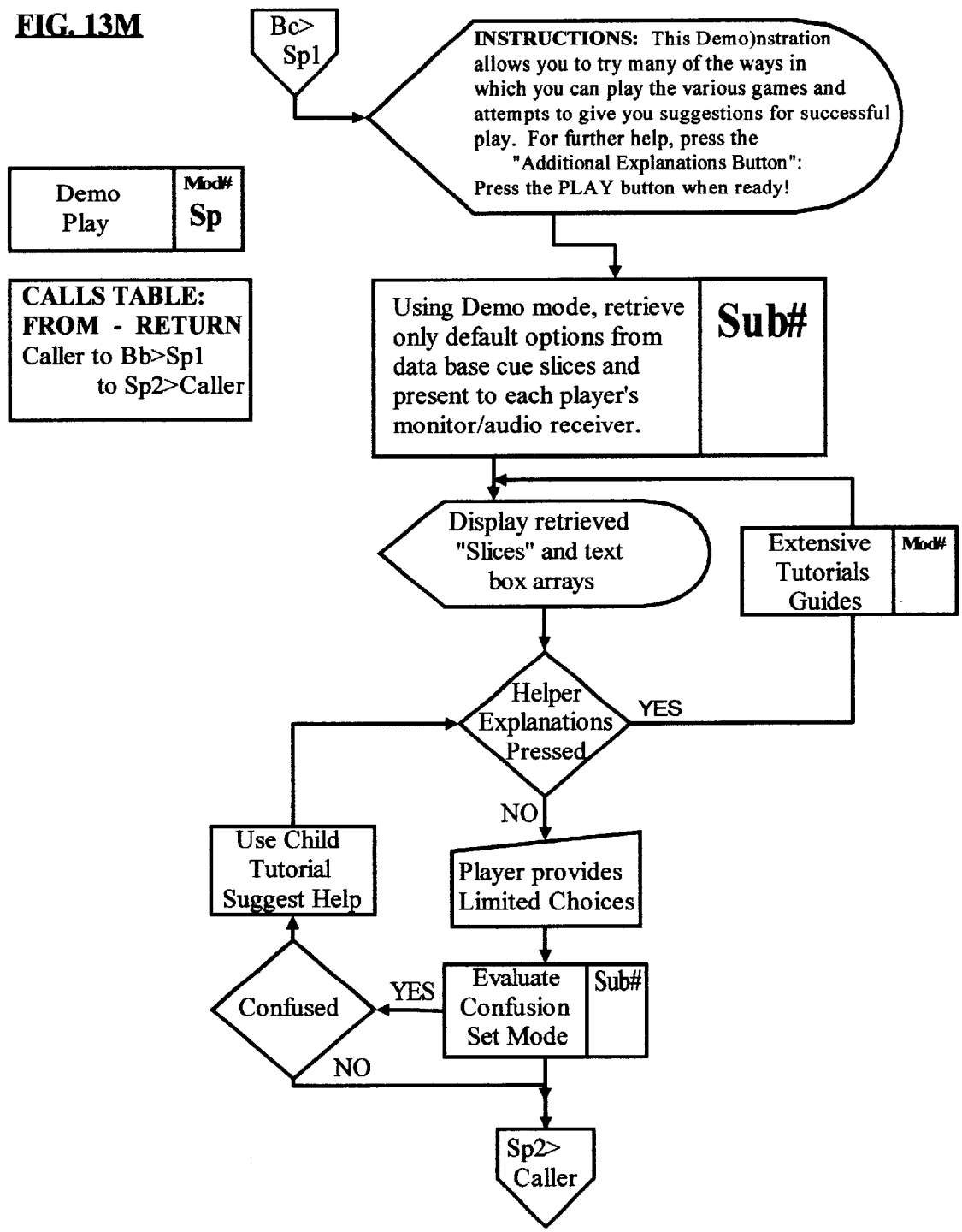
Figure 13N:
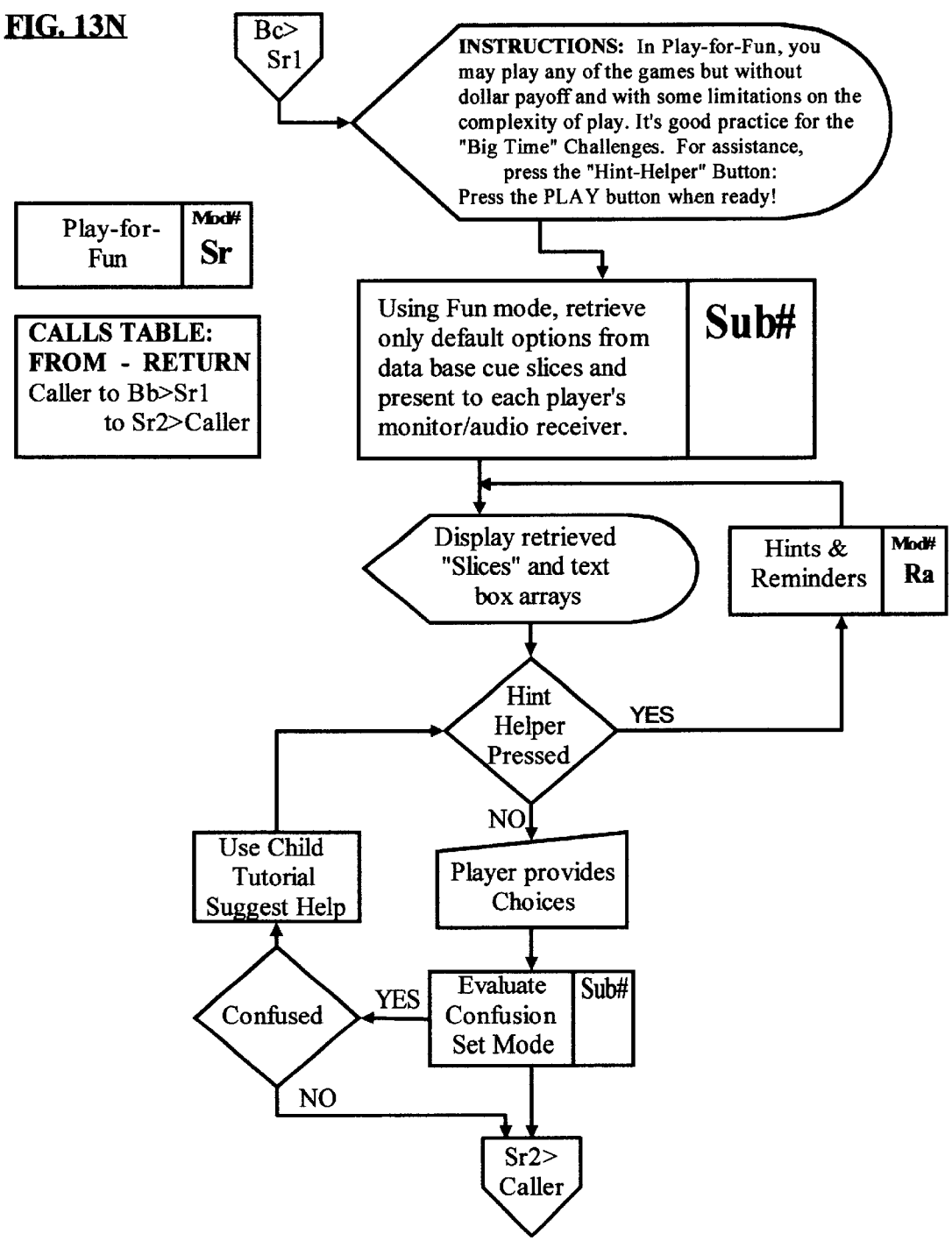

The flow charts of FIGS. 13A through 13N provide the process for playing the fourteen "S" or game Modules which are described by the Instructions to the player. Two of these games tend to differ somewhat from the others, but are nevertheless of the same basic essentials in that advertising segments are presented and player identifications of sponsor source are required in return. These are the two games Play-for-Fun and DEMO.

The flowcharts are self-explanatory and describe in detail how these fourteen respective games are played and how one differs from the other.

Figure 13O:
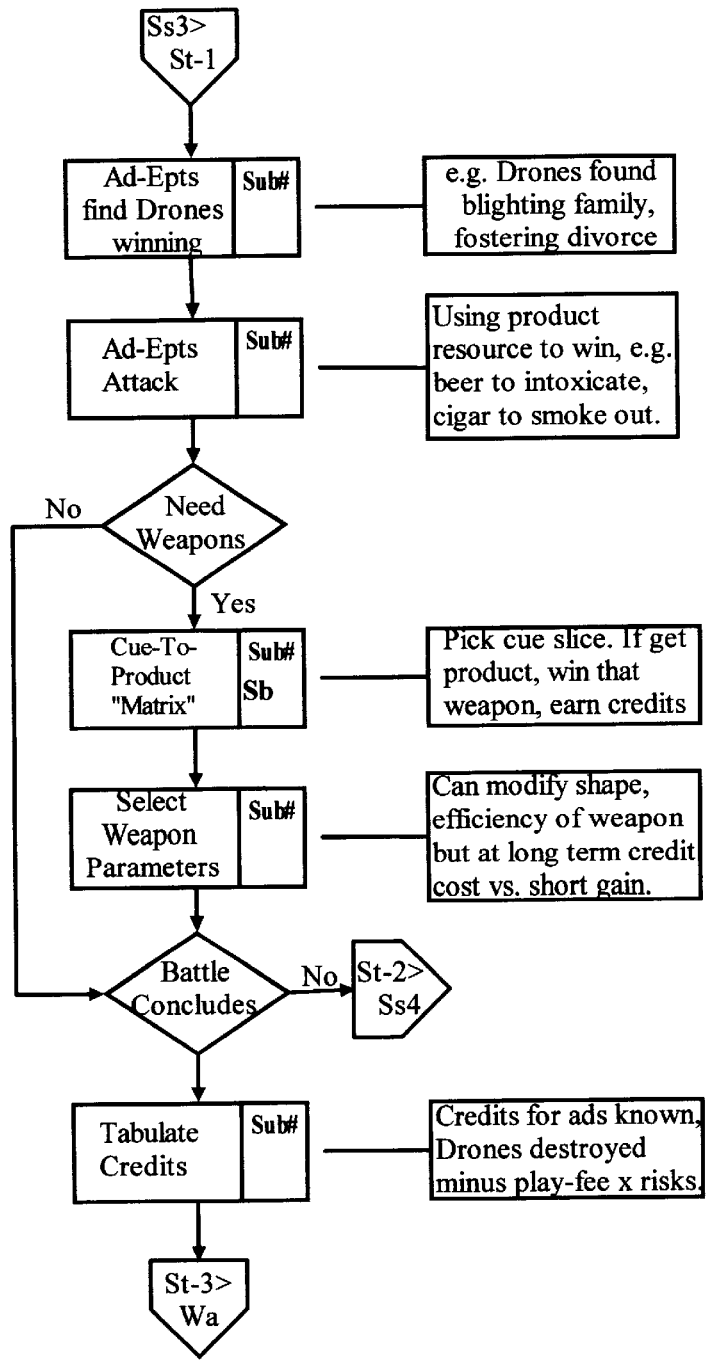
Figure 13P:
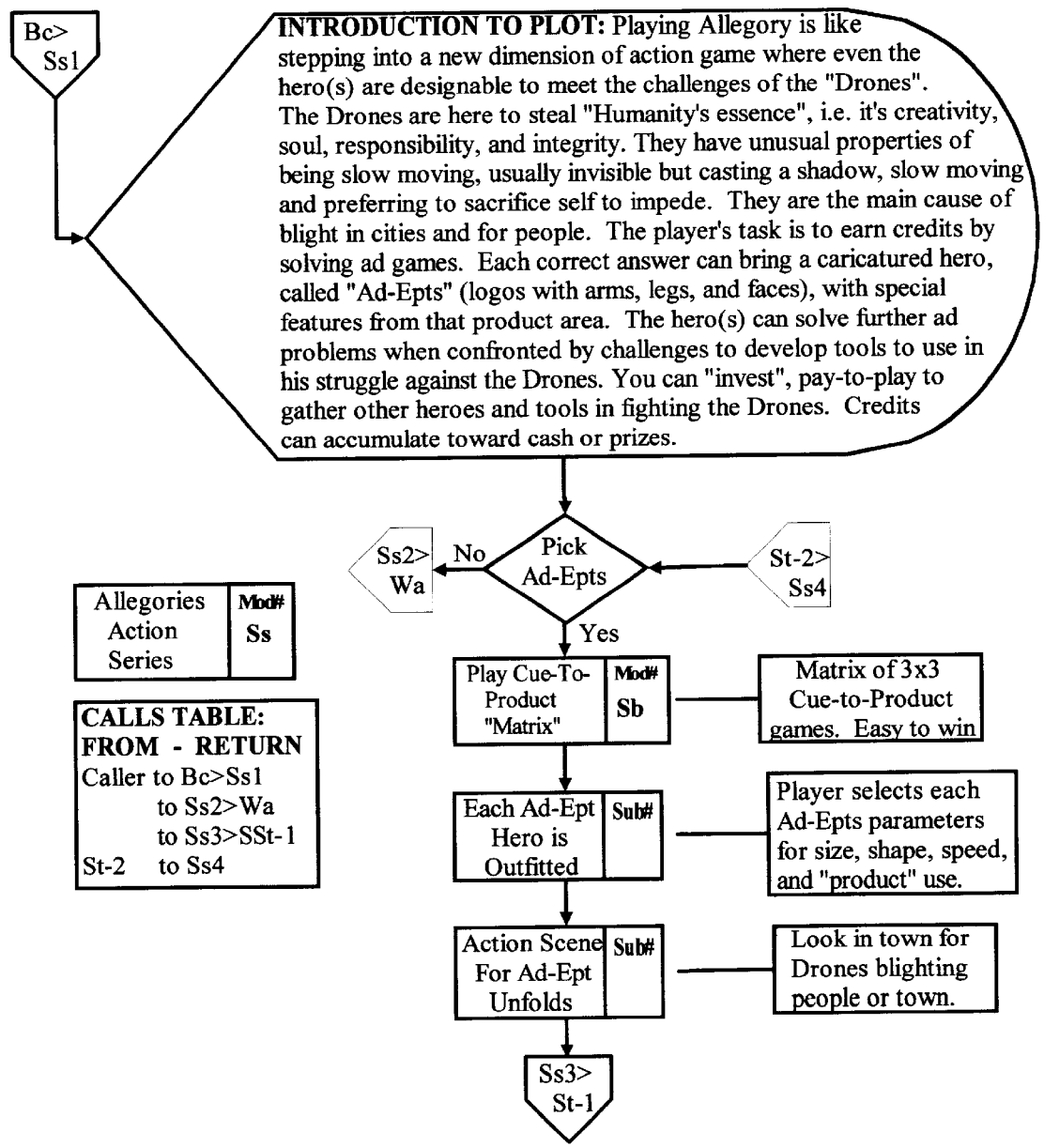

A somewhat unusual and different game is illustrated in the flowcharts of FIGS. 13O and 13P. This is referred to as the Allegories game. Although a different format than the preceding games, the Allegories game is nevertheless an example of the present invention as claimed hereinafter.

The Allegories game is similar to all the preceding game formats in that it requires the player to relate a slice from an advertisement to a product or manufacturer. In the earlier games, parameters were set for how the information could be presented. In Allegories, the process is made multidimensional by having the activities be dynamic, that is many changes over time as action unfolds. However, the task for the player is the same, recall a relationship between the advertisement and product. If you are correct, then you get to use that success by using the logo of the product or company to form a cartoon like character which becomes a hero, an "Ad-Ept" or a fancy "weapon" that the Ad-Epts can use in their battles against the "Drones".

The additional element added to the game is the varied selection of plots with layers of allegories. Depending on the successes that the player has in picking characters and/or weapons, the plot and unfolding action can be changed, leading to complex scenarios that can be played by children or adults. The nature of play is determined by the parameters allowed or selected by the player as it was in the "static" formats described.

The Format Sequence: The format presented here is only one allegoric plot which could be described. Like western novels which are said to have only seven plots, Allegories has formula plots as variation on the theme of good struggling with evil or more psychological, sub plots of "responsibility" being corrupted by denial. In the particular plot presented here, it is given that Drones are creatures with certain properties that the heroes may discover through play but whose mission is to steal the essences of humanity. Their effectiveness in doing this, and, therefore their location, is evidenced by problems mankind may experience.

The first task of the player is to find a surrogate hero(s). This is done by being presented with a 3×3 matrix of pictures, clicking on the one she/he may recognize as coming from an advertisement, and filling in the product and company name as in the Cue-to-Product format of the Sb Module in FIG. 13A. Here, the player gets to pick from a matrix of Cues, making the task easier. If the correct answer is given, the logo associated with this product becomes a cartoon character with arms, legs, and a face. Up to nine Ad-Ept heros could be selected this way at this time.

The next task for the player, is to assign further properties or parameters to the Ad-Epts heroes. These properties could be physical as in shape, size, speed or more subtle properties such as responsibility for other characters or creativity. These choices substantially contribute to how the plot would unfold, i.e. which scenario would be presented to the player.

Movements of the mouse and clicks of the keyboard control character movement through different scenes of the story creating the action of the game.

When the Drones are encountered, the Ad-Epts use the "native", product "talents". That is, a beer ad logo might spray a Drone, intoxicating it so that it behaves erratically. Or a toothpaste Ad-Ept (logo) might be mired down Drones in a slippery, cleaning, dissolving substance. A Wall Street brokerage Ad-Ept might tie Drones up with ticker tape or mislead them into a different target.

If the Ad-Epts are losing because they haven't picked the right parameters, the player has the options of finding additional Ad-Epts in the same way as the first or similarly to pick weapons that the existing Ad-Epts could use. The parameters for the "weapons" logos could have their parameters modified also depending upon the original investment or points earned during play. Then the interventions with the Drones continues with a modified scenario. This game format can sustain multiple repetitions because it is constantly modified by the choices made by the player in terms of both playing the Ad-Epts against the Drones, but by the scenarios associated with different ads retrieved for use as Ad-Epts or "weapons".

Points/credits can be assigned to successful recognition of Cue-to-Product choices and by the way the game is played out. A window will keep a running tally for the player. At the end of play, wins/losses are tallied and the player is moved to the usual outcome options Modules Wa and Xa.

Figure 14:
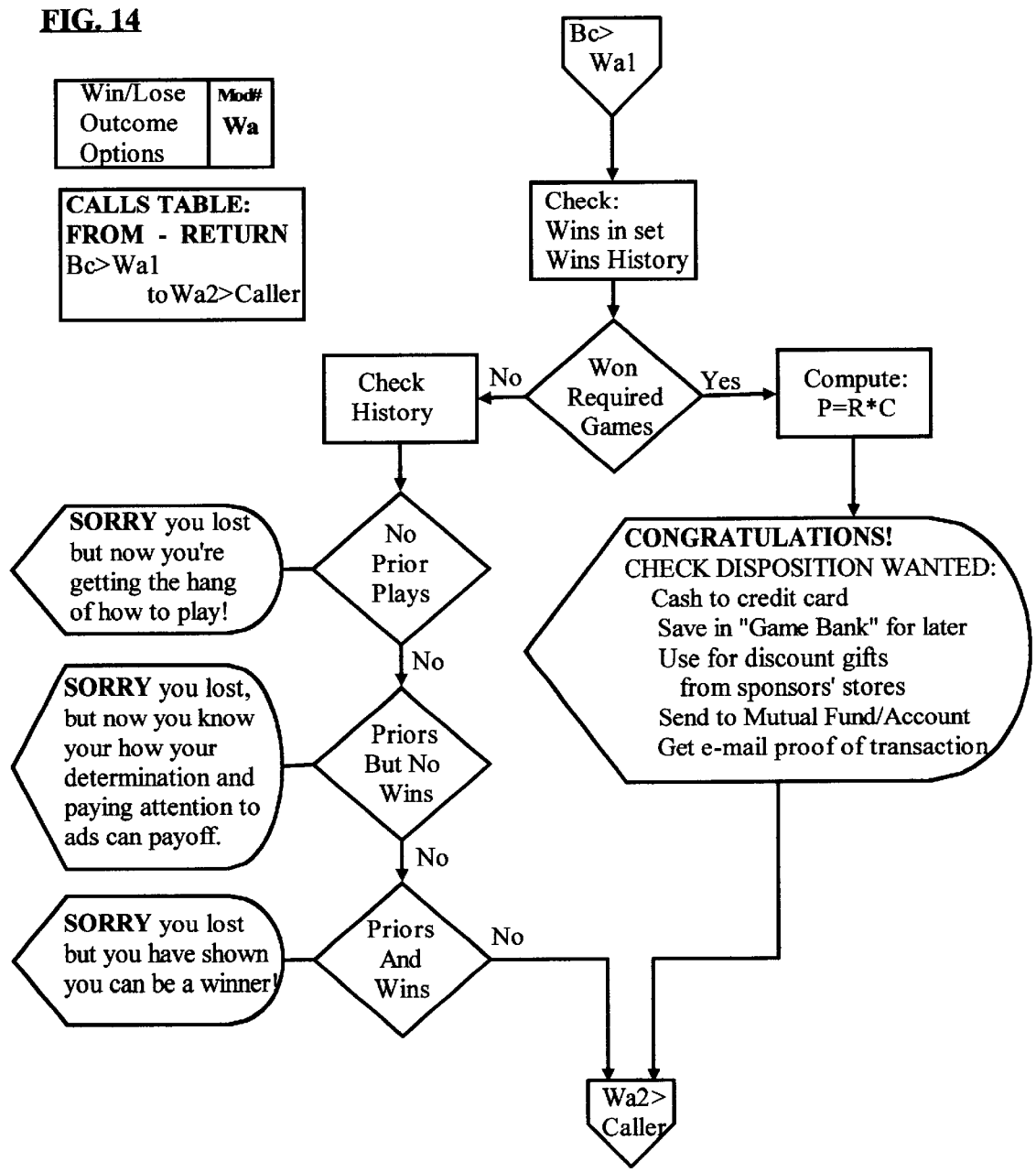
FIG. 14 is a flow chart that illustrates that process portion of the game of the present invention wherein player wins and losses are evaluated to provide win/lose dispositions.

The flowchart of FIG. 14 illustrates the evaluation portion or win/lose dispositions of the game. When the game selection has been processed, that is the number of repetitions of the game played through the required number of times and the result of each game is judged as a win or loss and the stored results are further processed to:

Determine if the number of wins in the set constitutes a "win" for purposes of payoff.

Store the number of games played in the player's "credit bank".

Check the player's prior playing "credit bank" (history) to see how many games that player has previously played.

Give a winner a choice as to how the player's winnings should be given to the player.

Figure 15:
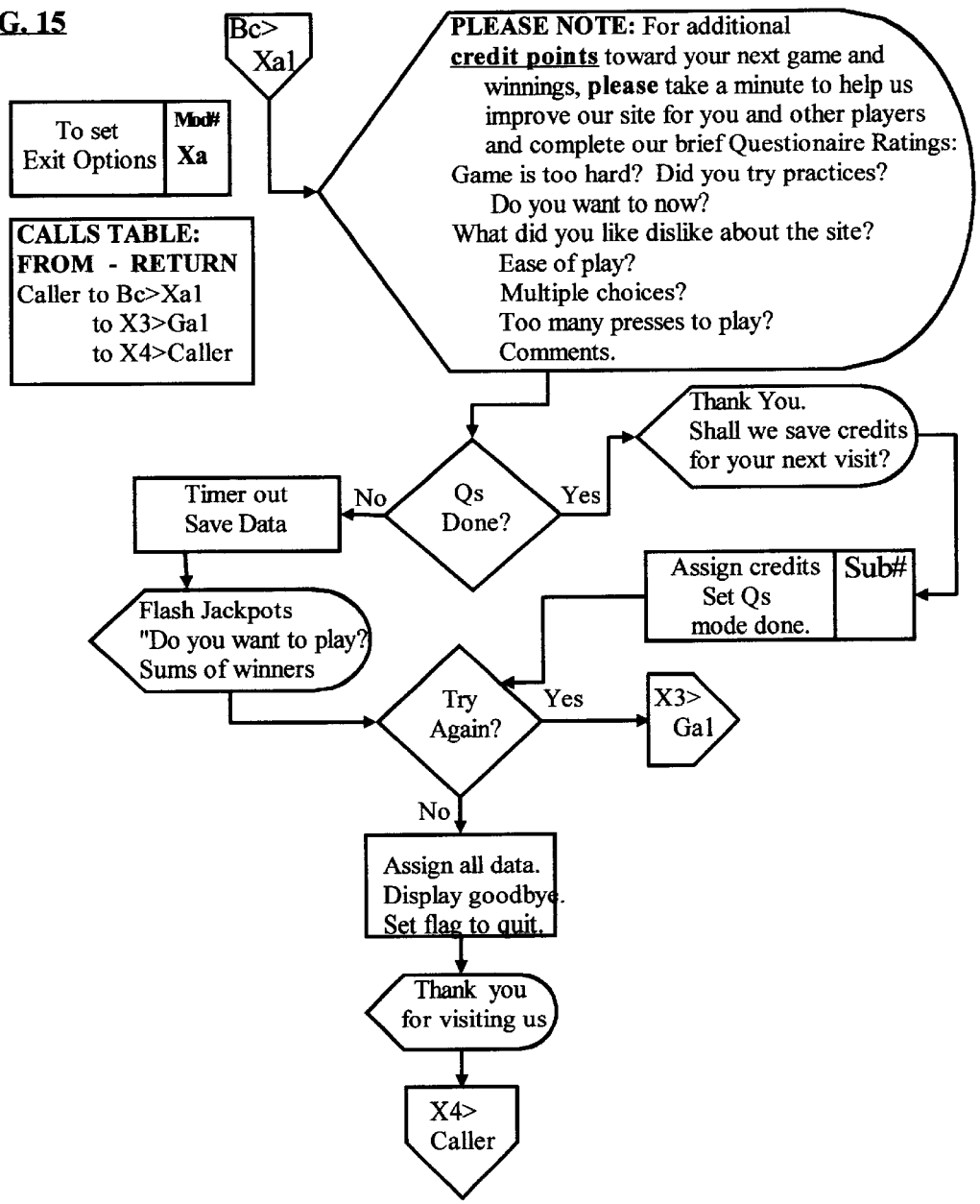
FIG. 15 is a flow chart illustrating the exit options for the game process of the present invention.

If the player is judged by the program to be a winner. A (P)ayoff is computed based upon the rate assigned to the player by some relationship to the player's prior playing credits. The player is congratulated and queried as to what would be the most convenient means of payment or disposition of these winnings, such as payment to the player's credit card company or even directly to a mutual fund account or selection from a list of gift options of equivalent value. If the player loses, the message to be sent to the player will depend upon the player's prior history of play. Then further disposition occurs in the exit Module as illustrated in the flowchart of FIG. 15.

The purpose of the Exit Module is to:

Gather exit information data for quality control.

Assign credits earned by play and/or completing questionnaires.

Invite or promote further play.

convey appreciation in a way to encourage return.

While the player can easily exit simply by choosing the Internet site, inducements to follow the process to the program's conclusion are provided by language tone, displays of available "jackpots" and current sums for winners and credits toward future play.

In order to more fully illustrate how the game would be presented over the Internet to a player and how a specific game will be played, the flowcharts of 16A, 16B and 16C illustrate a simulated PC screen example as presented to the player for the specific game Tag-Code. It is here displayed in much the same manner as an Internet screen would display the game except background color highlighting cannot be presented in this illustration. Accordingly, highlighting is indicated by bold lettering when the game selected is Tag—Code.

Figure 16A:
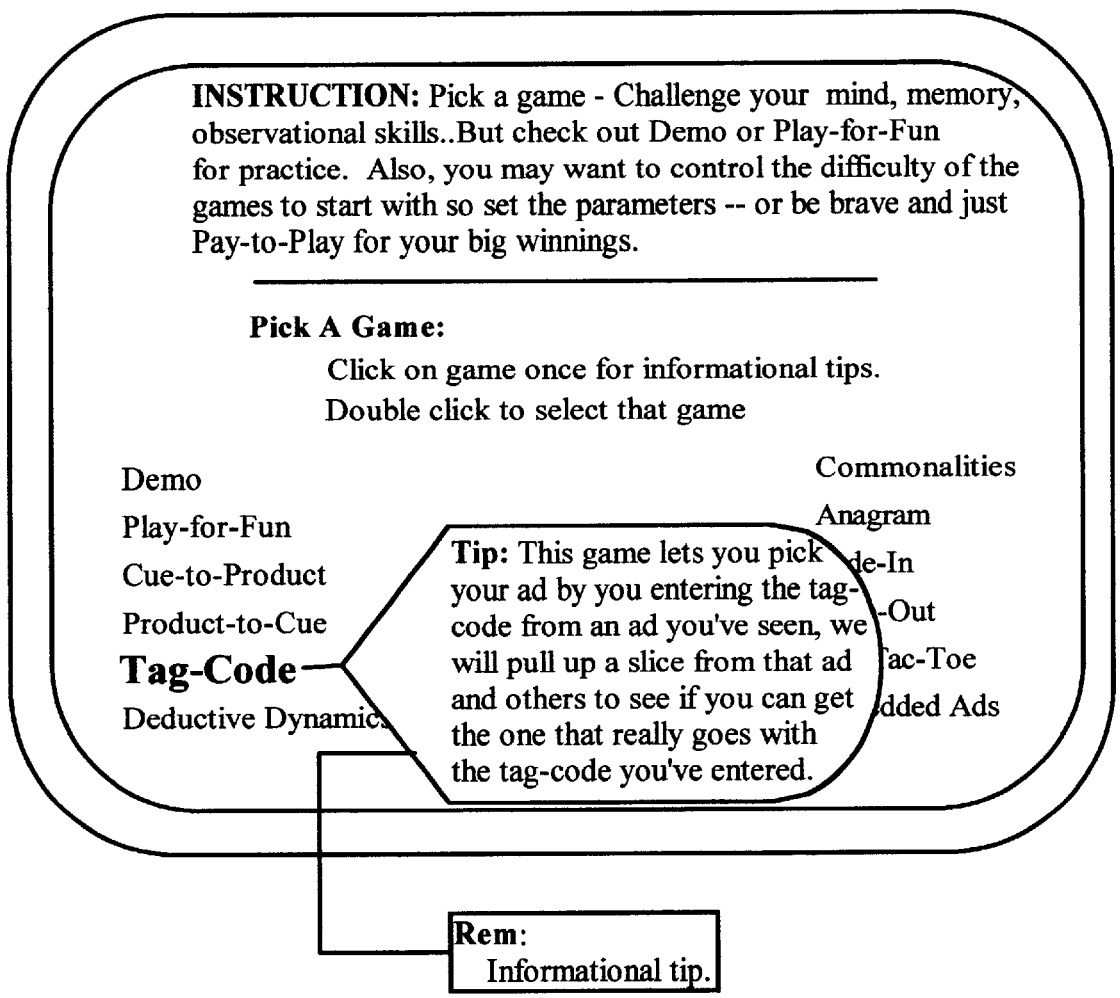

The Display/Monitor symbols shown in FIGS. 16A, 16B and 16C represent a "drop-down" of the item clicked on the player's mouse. Double clicking of the item results in that particular game being selected as in this example provided.

Figure 17:
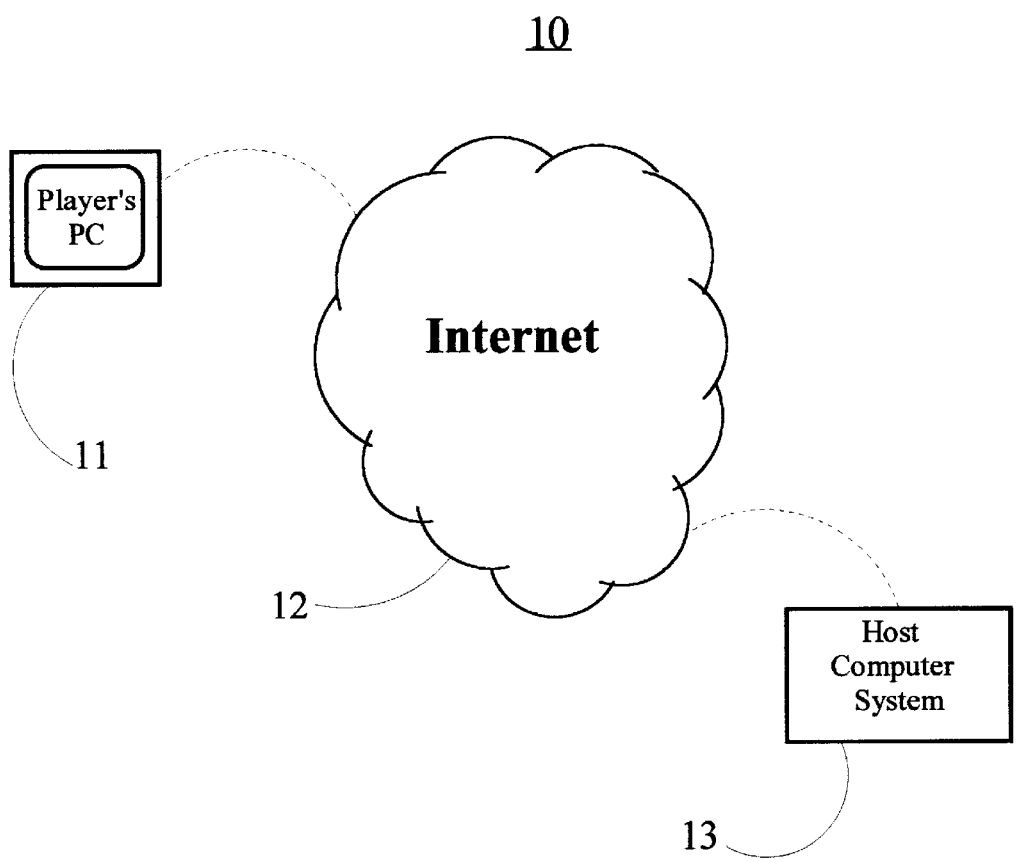
FIG. 17 is a schematic block diagram providing a diagrammatic overview of the computer system of the present invention which may be utilized to practice the method of the present invention.

Referring to FIG. 17, a diagrammatic overview of the computer system 10 is illustrated for providing apparatus to perform the method of the present invention for playing the game of skill described. This system 10 includes a player personal computer or PC 11, the Internet telecommunication network 12 and a host game computer system 13. The software enablement of the host computer system 13 permits the method of the present invention to be carried out and to transfer or communicate the results to the player computer processor or PC 11 via the Internet 12. It will be understood that a computer programmer of ordinary skill upon viewing this figure and understanding the flowchart disclosures herein, will be readily capable of writing the necessary program to carry out the functions required in order to operate the host game computer system 13 of the present invention as described and claimed.

The host computer system 13 has the required database management software running on the host computer system 13 for managing the database of advertisement segments which is created by data management software and stored in the database management software of the system. The host computer system 13 behaves as a server computer system enabling it to respond to player replies input on their respective PC 11 which is connected to the server of the host computer system 13 across the telecommunication network indicated as the Internet 12.

The host computer system 13 is programmed to receive binary encoded information from and send binary encoded information to the player computer processor PC 11 across the telecommunication network or Internet 12. It is further programmed to enable it to accept the specific information from players which is sent to the host computer system as binary encoded information.

The host computer system 13 is further programmed to enable it to retrieve the required advertisement segments from the database, format the information, and transfer the information to the potential customer processor PC 11 across the Internet 12 of telecommunication networks in a form whereby the player processor or PC 11 will be able to decode and interpret the information in order to play the game of the present invention. The system 13 is also programmed for enabling it to receive, decode, and interpret responses from the player computer data processor or PC 11 for playing the game of skill of the present invention, all as described in detail hereinbefore.

I claim:

1. A method of playing a game of skill comprising:
   generating a database of advertisement segments from published advertisements;
   presenting selected of the advertisement segments to a player for sponsor source identification;
   receiving player identifications of the sponsor sources of the respective advertisement segments presented;
   evaluating the player identifications for correctness; and
   displaying the evaluation results to the player.

2. The method of claim 1;
   prior to presenting the selected segments, presenting the player with personal identity information questions and receiving player responses thereto; and
   making personalized advertisement segment selections for the presentation based on the responses.

3. The method of claim 2 wherein presenting personal identity information questions includes presenting player registration questions.

4. The method of claim 3 wherein receiving player responses includes receiving a pre-game wager from the player.

5. The method of claim 1;
   prior to presenting the selections, presenting available game format selections to the player and receiving a player game format selection response; and
   making format selections accordingly for the presentation to be presented to the player.

6. The method of claim 1;
   prior to presenting the selections, presenting the player with skill level selections and receiving player selection responses thereto; and
   making difficulty selections for the presentation based on the player skill level selections.

7. The method of claim 6 including giving a reward to the player upon winning the game in proportion to the skill level selected.

8. The method of claim 1 including displaying game rule playing information to the player prior to presenting the selections.

9. The method of claim 1 including coding the advertisement segments for identification and retrieval from the database.

10. The method of claim 9 wherein coding includes tagging each advertisement segment with a multiple bit code which includes identification bits for the sponsor, the year the advertisement was published and the sequence in which the advertisement was published in that year.

11. A computer implemented method of playing a game of skill on a player personal computer having a local storage device and a display device, the computer being coupled to a network, the computer implemented method comprising the steps of:
    storing a database of advertisement segments from published advertisements in a local storage device of a remote host computer coupled to the network;
    displaying selected of the advertisement segments in a screen of the display device for sponsor source identification by a player;
    identifying on the personal computer the sponsor source of the respective advertisement segments displayed and transferring the identifications to the host computer for evaluation;
    evaluating the player identifications in the host computer for correctness; and
    displaying the evaluated results in the screen of the display.

12. The computer implemented method of claim 11 including displaying personal information questions in the screen of the display device prior to displaying the selected segments, and selecting the advertisement segments for display based on received responses to the questions.

13. The computer implemented method of claim 12 wherein displaying personal information questions includes displaying player registration questions.

14. The computer implemented method of claim 13 wherein receiving player registration responses includes receiving a pre-game wager is received from the player.

15. The computer implemented method of claim 11, including displaying available game format selections in the screen of the display device and receiving a player game format selection response prior to displaying the selections, and making format selections accordingly for the display of advertisement segments.

16. The computer implemented method of claim 11, including displaying skill level selections on the screen of the display device and receiving player selection responses thereto, and making difficulty selections for the displaying of selected advertisements segments based on the player skill level selections.

17. The computer implemented method of claim 16, including giving a reward to the player upon winning the game in proportion to the skill level selected.

18. The computer implemented method of claim 11, including displaying game rule playing information on the screen of the display device prior to displaying the advertised segments.

19. The computer implemented method of claim 11, including coding the advertisement segments for identification and retrieval from the database.

20. The computer implemented method of claim 19 wherein coding includes tagging each advertisement segment with a multiple bit code which includes identification bits for the sponsor, the year the advertisement was published and the sequence in which the advertisement was published in that year.

21. The computer implemented method of claim 20 wherein the multiple bit code also includes identification bits for tracking characterizations of each advertisement segment, said characterizations selected from a group including difficulty, type, and risk.

22. An apparatus for playing a game of skill comprising:
   a host computer system storing a database of advertisement segments from published advertisements in a local storage device and coupled to a network;
   a player personal computer coupled through the network to the host computer system for displaying selections of the advertisement segments to a player for sponsor source identification;
   said host computer system programmed for evaluating the player identifications and displaying the evaluated results in the screen of a display for the personal computer.

23. The apparatus of claim 22 wherein the host computer is programmed to display personal identity information questions on the personal computer and to receive player responses thereto and to further make personalized advertisement segment selections for the display based on the responses.

24. The apparatus of claim 23 wherein said host computer system is programmed for displaying player registration questions on the personal computer.

25. The apparatus of claim 24 wherein the host computer is programmed for receiving a pre-game wager from the personal computer as indicated by a player.

26. The apparatus of claim 22 wherein the host computer is programmed to display available game format selections on the personal computer and to receive a player game format selection response from the personal computer prior to displaying the selections for identification.

27. The apparatus of claim 22 wherein the host computer is programmed to display skill level selections on the personal computer and to receive player selection responses thereto prior to displaying the selections for identification and for further making difficulty selections for the selection display based on the player skill level selections.

28. The apparatus of claim 27 wherein the host computer is programmed to give a reward to the player which is displayed on the personal computer upon winning the game which reward is in proportion to the skill level selected.

29. The apparatus of claim 22 wherein the host computer is programmed to display game rule playing information on the personal computer for viewing by a player prior to displaying the selections for identification.

30. The apparatus of claim 22 wherein the host computer is programmed to identify and retrieve advertisement segments in the database by coding identification.

31. The apparatus of claim 30 wherein the coding includes tagging of each advertisement segment with a multiple bit code which includes identification bits for the sponsor, the year the advertisement was published and the sequence in which the advertisement was published in that year.

32. The computer implemented method of claim 31 wherein the multiple bit code also includes identification bits for tracking characterizations of each advertisement segment, said characterizations selected from a group including difficulty, type, and risk.

33. A storage medium encoded with machine-readable computer program code used in a host computer system for remote playing of a game of skill, the storage medium programmed for displaying selected advertisement segments of published advertisements on a remote player personal computer coupled to the host computer through a network, and for receiving and evaluating player identifications of sponsor sources of the advertisement segments and displaying the results to the player on the personal computer.

* * * * *